US 6,614,614 B1

(12) United States Patent
Murayama et al.

(10) Patent No.: US 6,614,614 B1
(45) Date of Patent: Sep. 2, 2003

(54) METHOD AND APPARATUS FOR WRITING SERVO PATTERN

(75) Inventors: Masashi Murayama, Yamato (JP);
Michiharu Saitoh, Yokohama (JP);
Atsushi Takeichi, Fujisawa (JP);
Hirofumi Yanase, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/445,792

(22) PCT Filed: Apr. 10, 1998

(86) PCT No.: PCT/JP98/01670
§ 371 (c)(1),
(2), (4) Date: Apr. 26, 2000

(87) PCT Pub. No.: WO99/53493
PCT Pub. Date: Oct. 21, 1999

(51) Int. Cl.[7] ............................................. G11B 5/596
(52) U.S. Cl. .............................. 360/77.02; 360/77.04
(58) Field of Search ........................ 360/75, 77.02, 360/77.07, 77.08, 77.11, 78.04

(56) References Cited

U.S. PATENT DOCUMENTS 4,414,589 A  * 11/1983 Oliver et al. ................. 360/77
5,486,964 A  * 1/1996 Morehouse et al. ......... 360/105
5,559,648 A  * 9/1996 Hunter et al. ................. 360/75
6,260,257 B1 * 7/2001 Emo et al. ................ 29/603.09

FOREIGN PATENT DOCUMENTS

| JP | 04-238171 | 8/1992 |
| JP | 05-128766 | 5/1993 |
| JP | 06-012800 | 1/1994 |
| JP | 07-272422 | 10/1995 |
| JP | 08-235749 | 9/1996 |
| JP | 08-297937 | 11/1996 |
| JP | 10-069724 | 3/1998 |

* cited by examiner

*Primary Examiner*—David Hudspeth
*Assistant Examiner*—Mitchell Slavitt
(74) *Attorney, Agent, or Firm*—Randall J. Bluestone; Bracewell & Patterson, L.L.P.

(57) ABSTRACT

The invention relates to a method for writing servo patterns on a data recording disk of a disk drive device. A read/write head is stopped at a reference position on the data recording disk, then the read/write head is moved along a radial direction of the data recording disk from the reference position, then a determination is made as to whether the data recording disk has a sufficient width along the radial direction to write a predetermined number of servo tracks, or not, then the servo patterns are written on the servo tracks if the data recording a disk has the sufficient width.

41 Claims, 15 Drawing Sheets

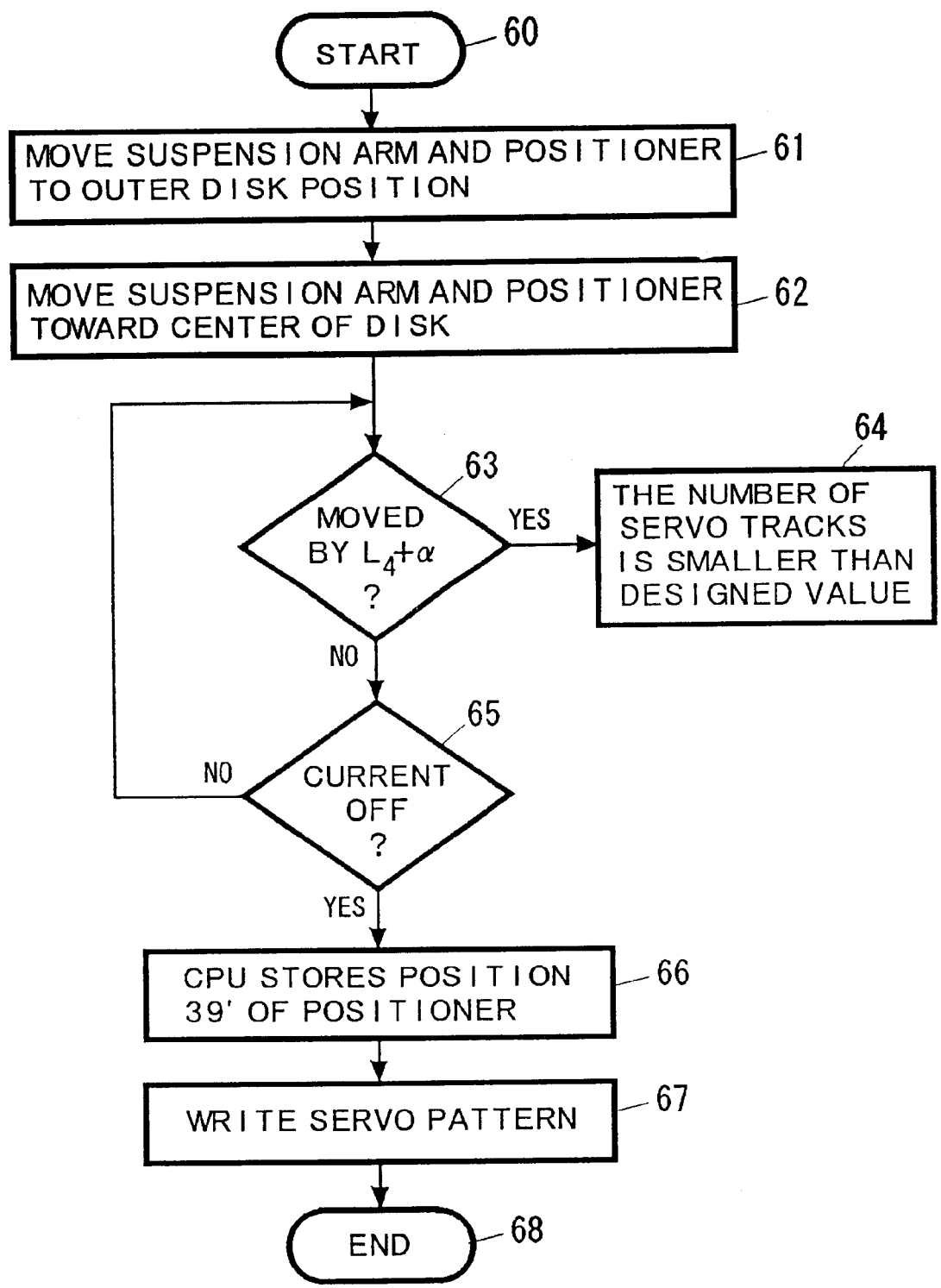
F I G. 5

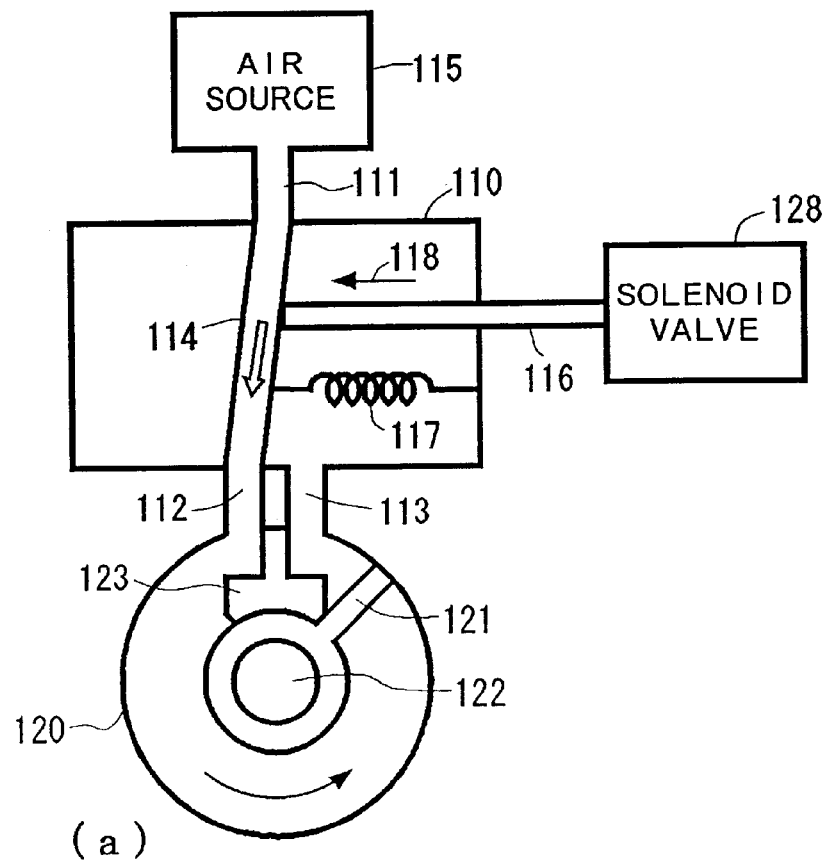
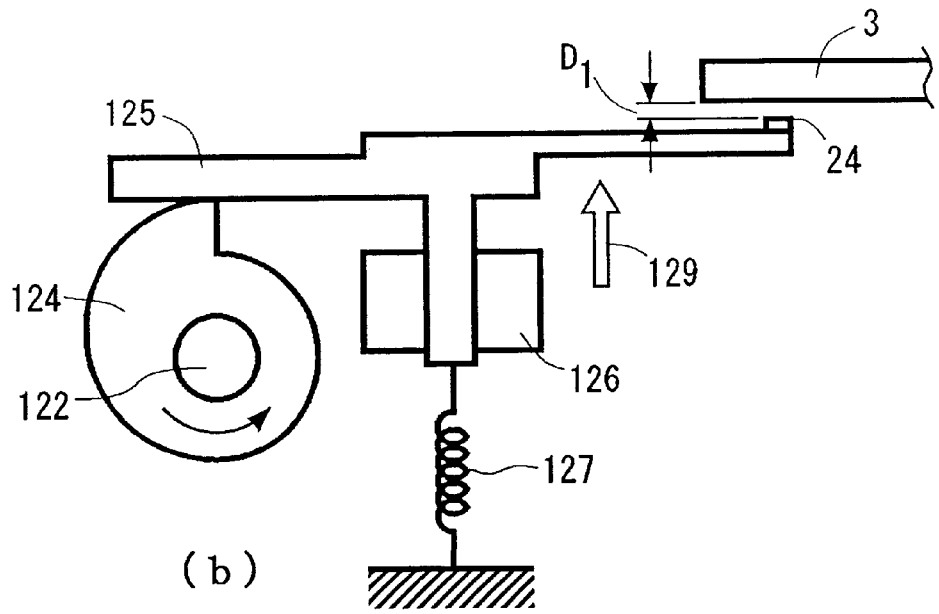
F I G. 1 3

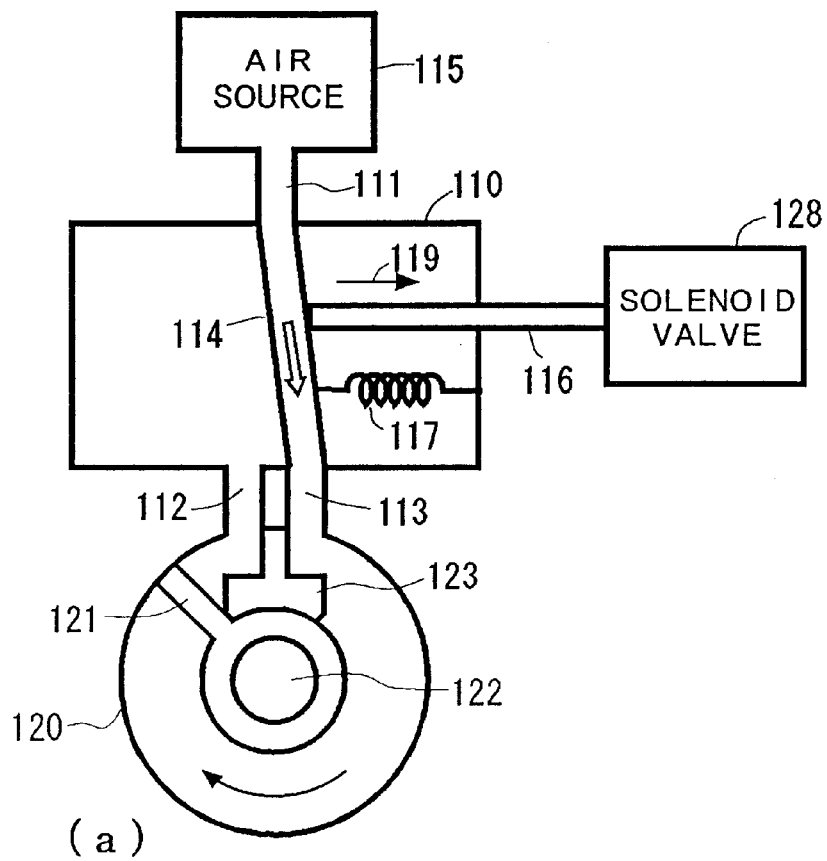
(a)
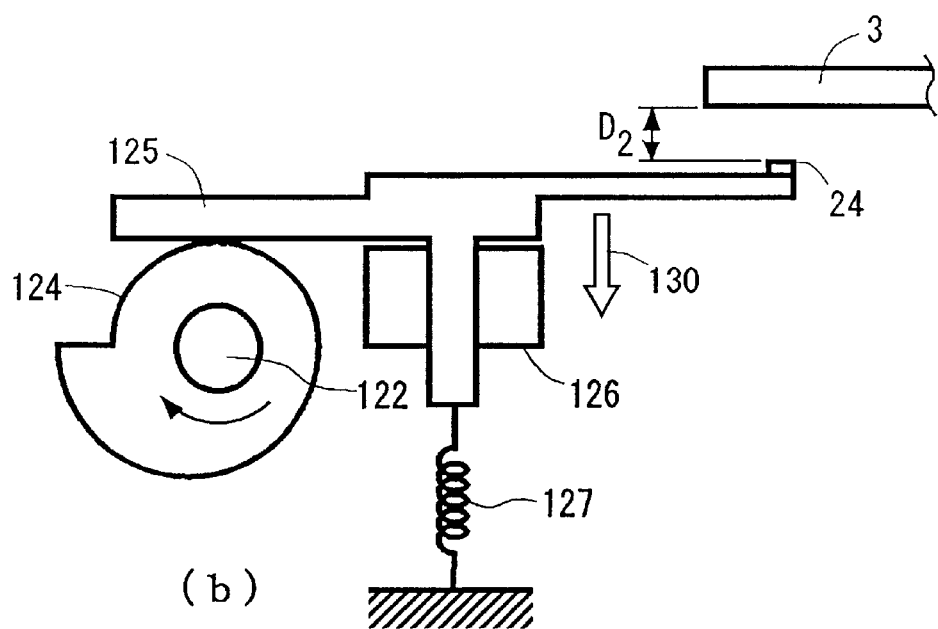
(b)
FIG. 14

METHOD AND APPARATUS FOR WRITING SERVO PATTERN

TECHNICAL FIELD

The present invention relates to a method and apparatus for writing servo patterns which precisely define an outer most or inner most servo track position on a data recording disk, and which senses a stop of a power from power supply to return a clock read/write head of a servo track writer and a data read/write head of a hard disk drive device to their stand by position, so that a sticking action of the clock read/write head and the data read/write head onto the data recording disk is prevented.

BACKGROUND ART

Servo patterns are written on a data recording surface of a data recording disk, such as a hard disk, by a servo track writer in a fabrication factory before shipment. In a hard disk drive device using a contact start stop (CSS) scheme, an inner crash stop member for defining an inner most position of a suspension arm which supports a read/write head and an outer crash stop member for stopping the suspension arm to position the data read/write head at an outer most servo track on the data recording surface are provided. When a power is off, the suspension arm is moved to engage with the inner crash stop member, and the data read/write head is landed on a landing zone provided on the inner most position of the data recording disk. To write the servo patterns on the data recording surface, the suspension arm is moved by a voice coil motor (VCM) until it engages with the outer crash stop member, and the servo pattern signal is supplied to the data read/write head from the servo pattern writer. After the servo pattern is written on the outer most servo track, a positioner of the servo track writer moves the suspension arm to a next servo track and the servo pattern is written. In this manner, the outer crash stop member is used as a reference position for defining the first servo track in the hard disk drive device using the CSS scheme.

The hard disk drive device using a load/unload scheme has recently been used in which a load/unload member is provided on an outer edge of the hard disk. When the read/write operation is terminated, the VCM moves the suspension arm toward the load/unload member until a front tab member of the suspension arm rides on a ramp surface of the load/unload member and the front tab member engages with an outer stop member on the load/unload member. When the front tab member rests at the outer stop member, the data read/write head is positioned at an outer disk position.

A first problem in writing the servo patterns on the hard disk using the load/unload member, it is impossible to precisely defining the position of the outer most servo track on the hard disk since the outer most crash stop member as used in the CSS scheme is not provided in the load/unload scheme. Also, a smooth surface of the hard disk using the load/unload scheme has the following second problem. Before the servo patterns are written on the hard disk, a clock pattern is written on a clock track positioned outside of the outer most servo track by a clock read/write head of the servo track writer which flies on the data recording surface of the hard disk. The clock pattern is read by the clock read/write head to define a space between the servo patterns along a circumference direction written by the data read/write head of the hard disk drive device. During writing the servo pattern, the clock read/write head of the servo track writer and the data read/write head of the hard disk drive device fly on the data recording surface. The second problem is that the clock read/write head and the data read/write head tend to stick on the surface of the hard disk when a spindle motor for rotating the hard disk is stopped due to an undesired stop of the power from the power source, so that the clock read/write head and the data read/write head are broken.

SUMMARY OF THE INVENTION

The object of the present invention is to provide a servo track writer and a method for writing the servo pattern which precisely define an outer most or inner most servo track position on the data recording surface.

The object of the present invention is to provide a servo track writer and a method for writing the servo pattern which sense the stop of the power from the power supply to return the clock read/write head of the servo track writer and the data read/write head of the hard disk drive device to their stand by position, so that the sticking action of the clock read/write head and the data read/write head onto the surface of the data recording disk is prevented.

BRIEF DESCRIPTION OF THE DRAWINGS

The invention is described in detail below with reference to the following drawings:

FIG. 5 shows a flow chart of the operation of the second embodiment of the present invention.

FIG. 13 shows an operation of a structure of a sixth embodiment of the present invention when the power is applied.

FIG. 14 shows an operation of the structure of the sixth embodiment of the present invention when the power is stopped.

BEST MODE FOR CARRYING OUT THE INVENTION

Figure 1:
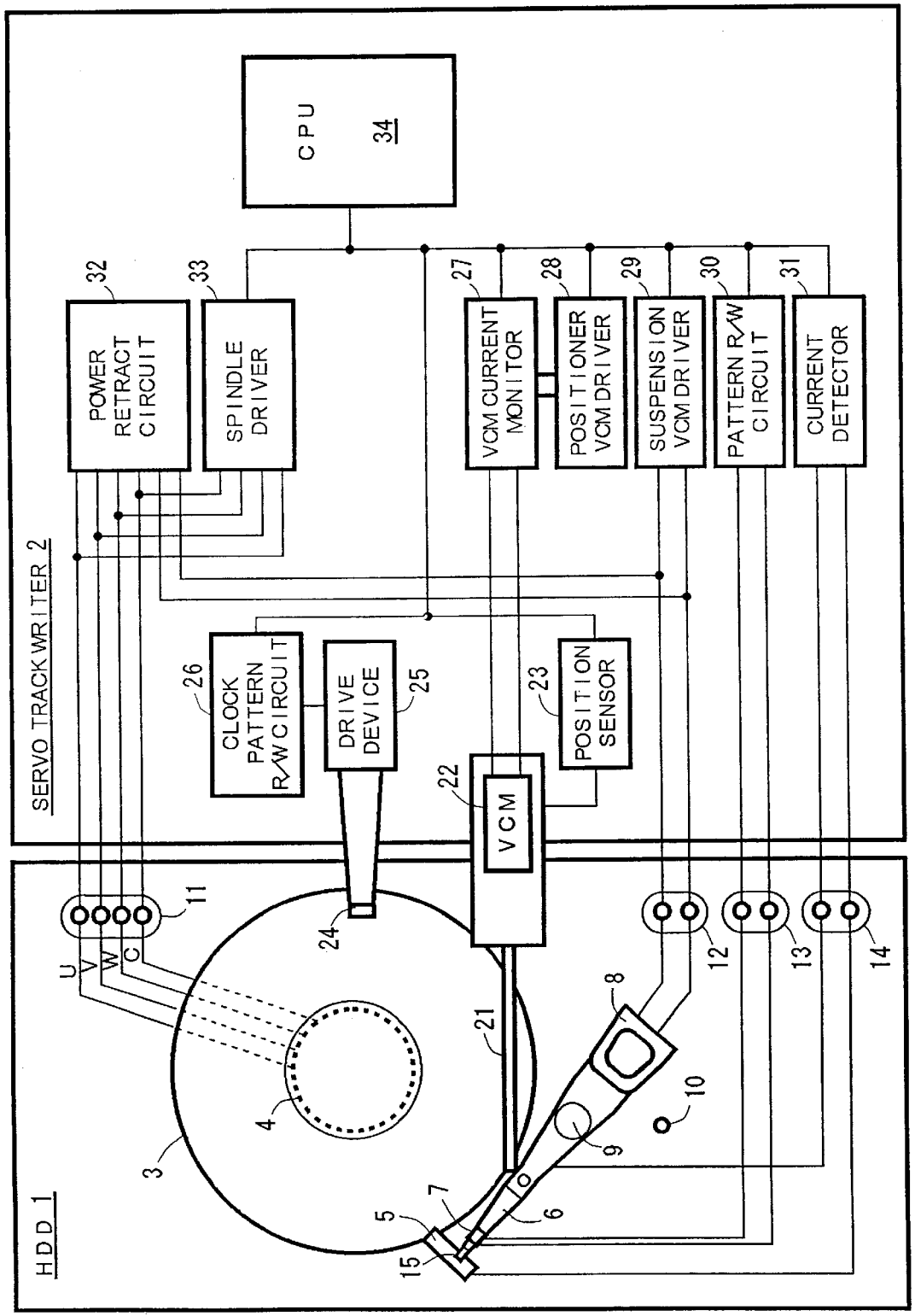
FIG. 1 shows a schematic block diagram of a disk drive device and a servo track writer in accordance with the present invention.

FIG. 1 shows a hard disk drive device 1 and a servo track writer 2. A data recording disk or a magnetic recording disk 3 called as a hard disk is rotated by a spindle motor 4 mounted on a base member of the hard disk drive device 1. A road/unload member 5 is mounted on a periphery of the hard disk 3. A suspension arm 6 is pivotally mounted on the base member at a pivot point 9. A data read/write head 7 is mounted on a front portion of the suspension arm 6 and is moved in a radial direction of the hard disk 3 by a voice coil motor (VCM) 8 to read the data or the servo pattern from or write the data or the servo pattern on the hard disk 3. An inner crash stop member 10 is mounted on the base member to stop the suspension arm 6 at an inner most position on the hard disk 3. When the read/write operation of the data is terminated and the suspension arm 6 is moved in a counter clock wise direction by the VCM 8, a front tab member 15 of the suspension arm 6 rides on a ramp surface of the load/unload member 5 and engages with an outer stop member of the load/unload member 5 to position the data read/write head 7 at an outer disk position. Connecting terminals 11 connected to windings or coils U, V, W and a common connecting point C of the spindle motor 4, connecting terminals 12 connected to the VCM 8, connecting terminals 13 connected to the data read/write head 7 and connecting terminals 14 connected to the load/unload member 5 and the suspension arm 6 are provided. When the servo tracks defining the data recording tracks are written on the hard disk 3, these connecting terminals 11, 12, 13 and 14 are selectively connected to the servo track writer 2.

The servo track writer 2 is used to write the servo patterns on the data recording surfaces of the hard disk 3. The servo track writer 2 includes a positioner or positioning rod 21, a positioner VCM 22, a position sensor 23, clock read/write head 24, a drive device 25, a clock pattern read/write circuit 26, a VCM current monitor 27, a positioner VCM driver 28, a suspension VCM driver 29, a pattern read/write circuit 30, a current detector 31, a power off retract circuit 32, a spindle driver 33 and a CPU 34. The positioner VCM 22 is controlled by the positioner VCM driver 28 to move the positioner 21 by which the data read/write head 7 of the suspension arm 6 is moved between the inner most position on the hard disk 3 defined by the inner crash stop member 10 and the outer disk position defined by the outer stop member on the load/unload member 5. The outer stop member is described in detail with reference to FIG. 2. The position sensor 23 senses the position of a front end of the positioner 21 and sends position signals indicating the position of the positioner 21 to the CPU 34 during the movement of the positioner 21. The VCM current monitor 27 detects a current value flowing through the positioner VCM 22, and sends signals indicating the value of the current to the CPU 34. The clock read/write head 24 is positioned on a clock pattern track located at an outer position of the outer most servo track on the hard disk 6 by the drive device 25 to write clock patterns supplied from the clock pattern read/write circuit 26 on the clock pattern track. Before the servo patterns are written on the hard disk 3, a clock pattern is written on a clock pattern track by the clock read/write head 24, and the clock pattern is read by the clock read/write head 24 to define a space between the servo patterns along a circumference direction.

The suspension VCM driver 29 is connected to the connecting terminals 12 to drive the VCM 8 of the hard disk drive device 1 when the servo patterns are written on the hard disk 3 in the fabrication factory before shipment. The pattern read/write circuit 30 is connected to the connecting terminals 13 to write servo patterns on the servo tracks or read the servo patterns when the servo patterns are written. The current detector 31 is included in the servo track writer 2 in a second embodiment of the present invention, and is connected to the connecting terminals 14 when the servo patterns are written in the second embodiment. The power off retract circuit 32 is connected to the connecting terminals 11 when the servo patterns are written. The spindle driver 33 is connected to the connecting terminals 11. It is noted that a control card of the hard disk drive device 1 is not mounted when the servo patterns are written of the hard disk 3, and the spindle motor 4, the VCM 8 and the data read/write head 7 of the hard disk drive device 1 are controlled by the servo track writer 2. The CPU 34 controls the operation of all the blocks described above.

Figure 2:
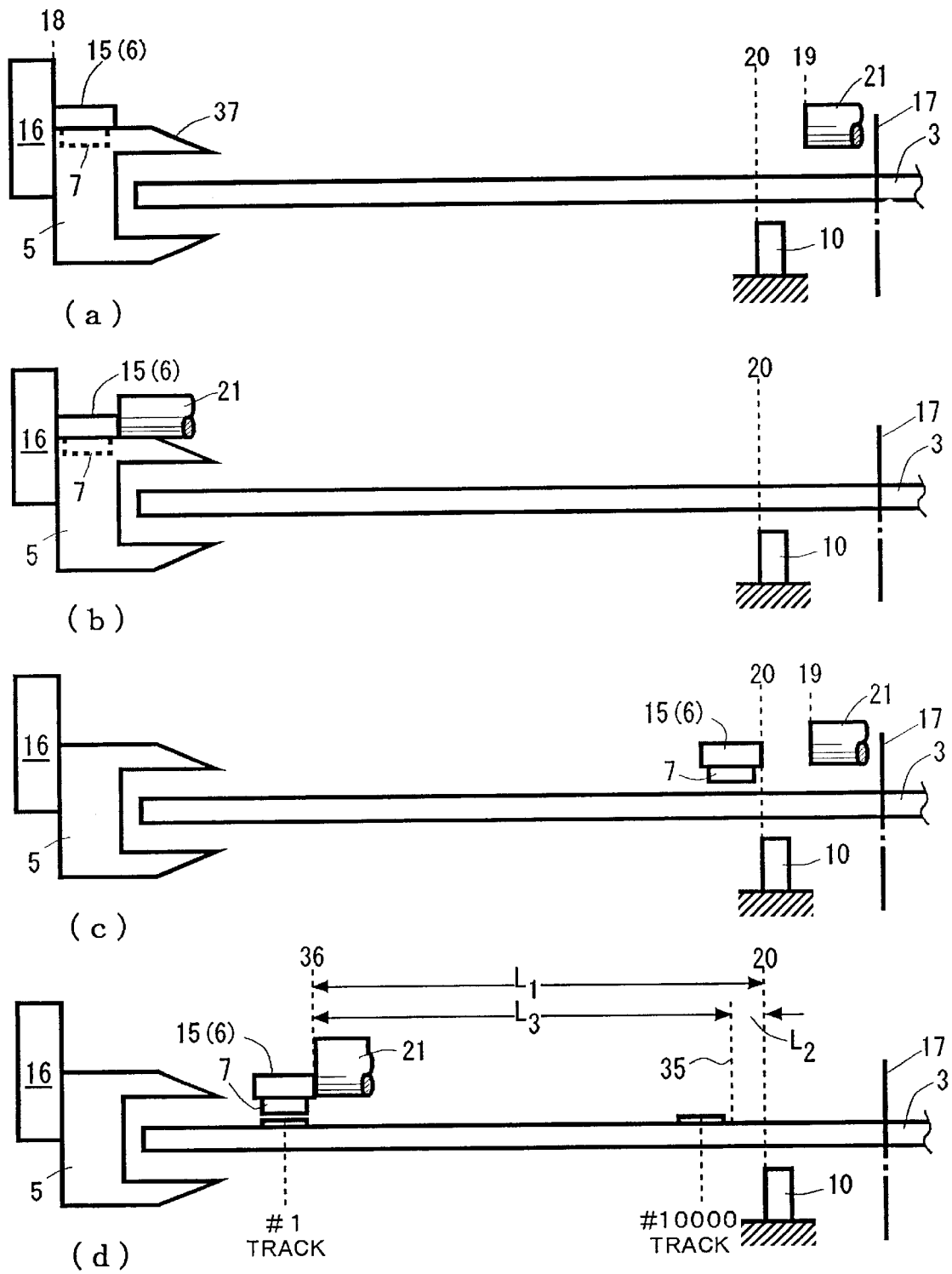
FIG. 2 shows a structure of a first embodiment of the present invention.
Figure 3:
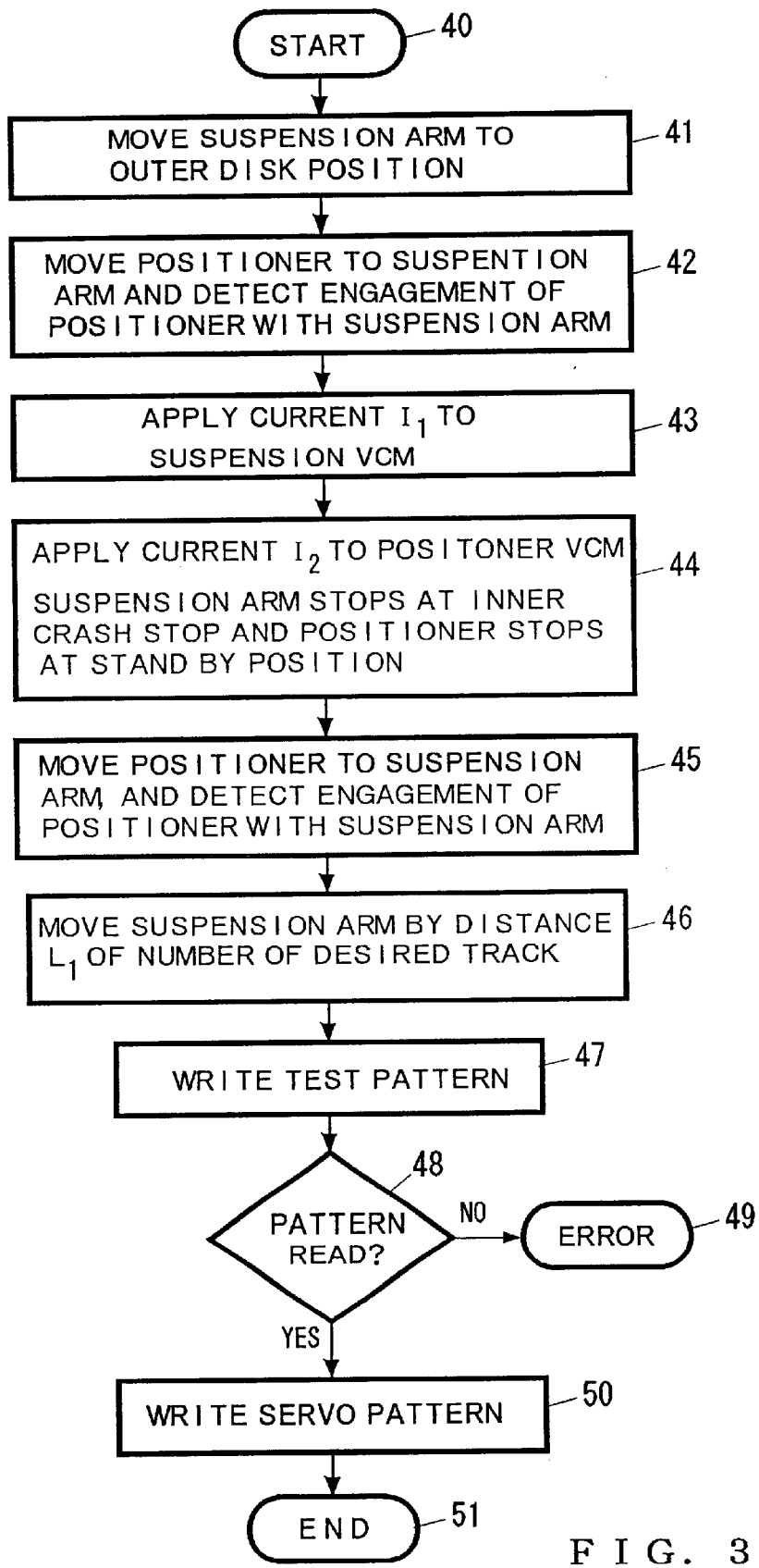
FIG. 3 shows a flow chart of the operation of the first embodiment of the present invention.

The FIGS. 2 and 3 show the operation of a first embodiment for finding a position of a first servo track in accordance with the present invention. The FIGS. 2(a) through 2(d) show a portion of the hard disk 3 including a center 17, the load/unload member 5 and the inner crash stop member 10. The inner crash stop member 10 is shown below the hard disk 3, and one hard disk 3 and one data read/write head 7 are shown for simplify the drawings. Actually, the hard disk drive device 1 may include a plurality of hard disks 3 and a plurality of the data read/write heads 7. The operation starts at a block 40 in the FIG. 3, and the operation proceeds to a block 41 in which the CPU 34 controls the suspension VCM driver 29 to activate the VCM 8 to move the front tab member 15 of the suspension arm 6 and the data read/write head 7 to the outer disk position 18 defined by the outer stop member 16 of the load/unload member 5, and the CPU 34 controls the positioner VCM driver 28 to activate the positioner VCM 22 to move the positioner 21 to the standby position 19, as shown in the FIG. 2(a). The position sensor 23 senses the position of the positioner 21 and sends the position data to the CPU 34. The CPU 34 performs the control operation for stopping the positioner 21 when it is positioned at the standby position 19. The operation proceeds to a block 42 in which the CPU 34 controls the positioner VCM driver 28 to activate the positioner VCM 22 to move the positioner 21 toward the outer disk position 18. When the positioner 21 engages with the suspension arm 6, the current flowing through the positioner VCM 22 increases, and this increase of the VCM current is detected by the VCM current monitor 27, which sends the current value to the CPU 34, which controls the positioner VCM driver 28 to stop the positioner 21, as shown in the FIG. 2 (b).

The operation proceeds to a block 43 in which the CPU 34 controls the suspension VCM driver 29 to apply the current $I_1$ to the VCM 8 for biasing the suspension arm 6 toward the center 17 of the hard disk 3. At this point of time, the biasing force by the VCM 8 balances to the force applied by the positioner 21, so that the suspension arm 6 engaged with the positioner 21 is stopped at the position shown in the FIG. 2(b). The operation proceeds to a block 44 in which the CPU 34 controls the positioner VCM driver 28 to apply a current $I_2$ to the positioner VCM 22 for moving the positioner 21 toward the center 17 of the hard disk 3 which is smaller than the current $I_1$, so that the suspension arm 6 engaged with the positioner 21 is gradually moved toward the center 17 of the hard disk 3. When the suspension arm 6 reaches the a reference position 20 of the inner crash stop member 10, the movement of the suspension arm 6 is stopped at the inner crash stop member 10, but the positioner 21 is continuously moved and stopped at the standby position 19, as shown in the FIG. 2(c). The operation proceeds to a block 45 in which the CPU 34 controls the positioner VCM driver 28 to activate the positioner VCM 22 to move the positioner 21 toward the suspension arm 6 stopped at the inner crash stop member 10. When the positioner 21 engages with the suspension stopped at the position 20 of the inner crash stop member 10, the current flowing through the positioner VCM 22 increases, and this increase of the current is detected by the VCM current monitor 27, which sends the current value to the CPU 34, so that the engagement of the positioner 21 with the suspension arm 6 is detected.

The operation proceeds to a block 46 in which the CPU 34 controls the positioner VCM driver 28 and the suspension VCM driver 29 to activate the positioner VCM 22 and the suspension VCM 8, respectively to move the suspension arm 6 engaged with the positioner 21 toward the peripheral of the hard disk 3 by a predetermined distance $L_1$, as shown in the FIG. 2(d). The distance $L_1$ indicates the number of incremental steps of the positioner 21, and the distance $L_1$ is a sum of a distance $L_2$ and a distance $L_3$, wherein the distance $L_2$ indicates a width or distance of an inner guard band between the position 20 of the inner crash stop member 10 and the position 35 of the positioner 21 for writing the inner most servo track, and the distance $L_3$ indicates a designed distance or a width along the radial direction of the hard disk 3 for writing a predetermined number of servo tracks, such as 10,000 servo tracks. The movement of the positioner 21 is measured by the position sensor 23. As the positioner 21 is moved, the position sensor 23 sends the position data to the CPU 34, which controls the positioner VCM driver 28 and the suspension VCM driver 29 based upon the position data. When the CPU 34 detects that the positioner 21 and the suspension arm 6 have been moved by the distance $L_1$, both the positioner 21 and suspension arm 6 are stopped at the position 36, as shown in the FIG. 2(d). The data read/write head 7 stopped at the position shown in the FIG. 2(d) defines the outer most servo track #1. The operation proceeds to a block 47 in which the CPU 34 controls the pattern read/write circuit 30 to apply a test pattern signal to the data read/write head 7 stopped above the outer most servo track #1. The test pattern is written at 10 MHz which is the same as a frequency of the servo patterns. The operation proceeds to a block 48 in which the CPU 34 controls the pattern read/write circuit 30 to read the test pattern written on the #1 servo track, and the pattern read/write circuit 30 determines as to whether the test signals is correctly read, or not. If the answer of the block 48 is NO, the operation proceeds to a block 49. The block 49 represents that it was failed to write the test pattern on the outer most servo track. The cause of the error may be that the load/unload member 5 is not precisely mounted at the periphery of the hard disk 3, and when the data read/write head 7 is moved by the distance $L_1$, the front end 15 of the suspension arm 6 supporting the data read/write head 7 rides on the ramp surface 37 of the load/unload member 5, so that the test pattern is not precisely written on the outer most servo track #1. The block 48 determines as to whether the hard disk 3 now being tested has a sufficient width along the radial direction of data recording surface to write the predetermined number of servo tracks, for example 10,000 servo tracks, or not. If the answer of the block 48 is YES, the operation proceeds to a block 50 in which the CPU 34 controls the pattern read/write circuit 30 to erase the test pattern on the outer most servo track written in the block 47, then to write the servo pattern on the outer most servo track #1, then to move the data read/write head 7 to a next servo track #2 to write the servo pattern on the servo track #2. The write operation is repeated until the servo pattern is written on the #10,000 servo tracks. The operation proceeds to a block 51 in which the operation is terminated.

Figure 4:
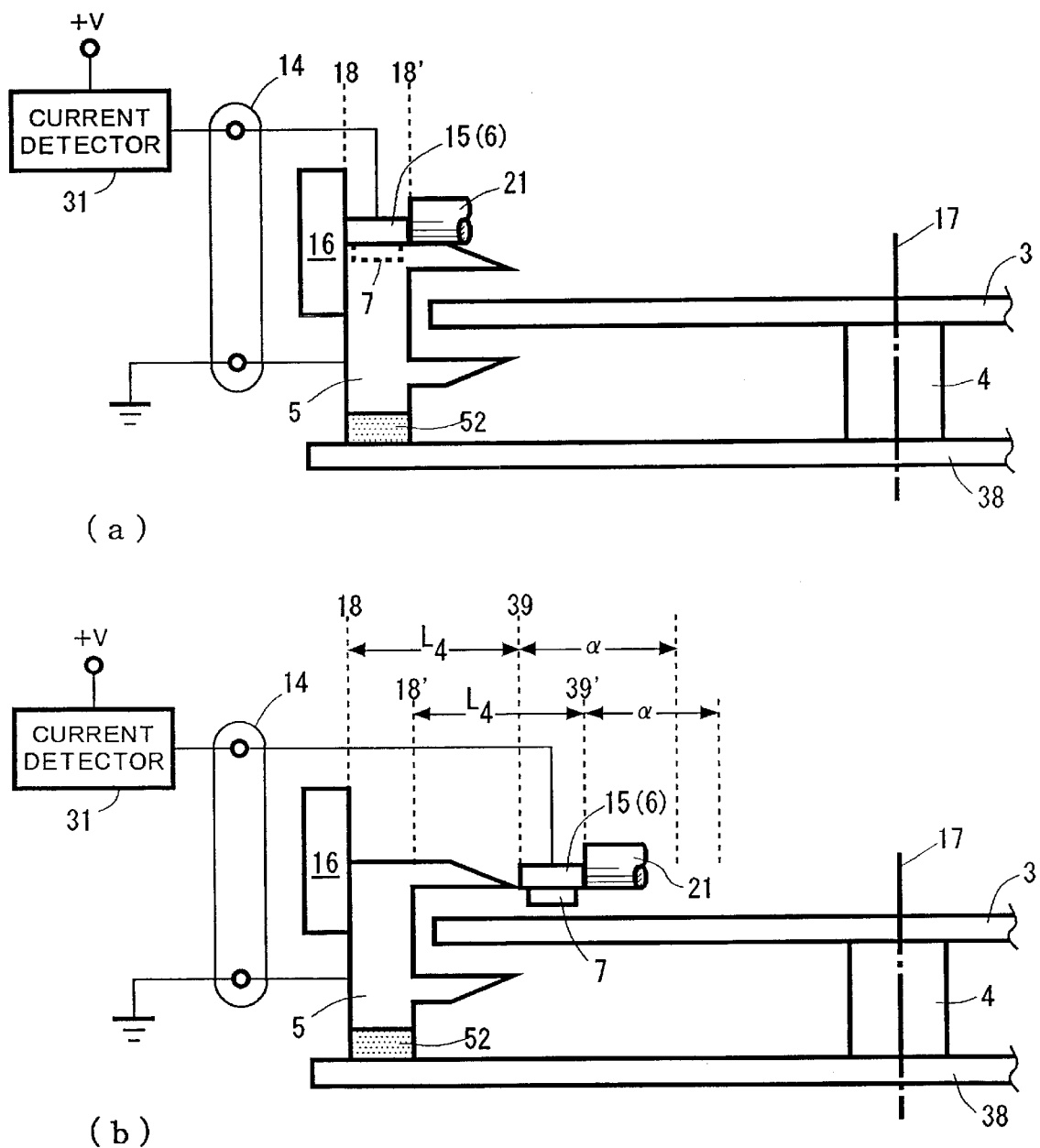
FIG. 4 shows a structure of a second embodiment of the present invention.

The FIGS. 4 and 5 show the operation of a second embodiment for finding a position of a first servo track in accordance with the present invention. The FIGS. 4(a) and 4(b) show a structure of the hard disk drive device 1 in which the road/unload member 5 is made of an electrically conductive material, and an insulating member or an electrically non-conducting member 52 is mounted between an electrically conductive load/unload member 5 and an electrically conductive base member 38 of the disk drive device 1 to electrically isolate them. The connecting terminals 14 are connected to the load/unload member 5 and the electrically conductive suspension arm 6, respectively, and the terminals 14 are connected to the current detector 31 of the servo track writer 2 and a reference or ground potential, respectively. One hard disk 3 and one data read/write head 7 are shown for simplify the drawings. Actually, the hard disk drive device 1 may include a plurality of hard disks 3 and a plurality of the data read/write heads 7. The FIG. 5 shows an operational flow chart of the second embodiment. The operation starts at a block 60, and the operation proceeds to a block 61 in which the CPU 34 controls the suspension VCM driver 29 and the positioner VCM driver 28 to move the front tab member 15 and the data read/write head 7 of the suspension arm 6 and the positioner 21 of the servo track writer 2 to the outer disk position 18, as shown in the FIG. 4(a). In the operation of the block 61, since the electrically conductive front tab member 15 of the suspension arm 6 contacts with the electrically conductive load/unload member 5, the current flows from a voltage source +V to a reference potential, and the current detector 31 detects this current and sends a detect signal indicating the flow of the current to the CPU 34. The position sensor 23 senses the position of the positioner 21 at its outer disk position 18' and sends a position signal to the CPU 34. The operation proceeds to a block 62 in which the CPU 34 controls the suspension VCM driver 29 and the positioner VCM driver 28 to move the front tab member 15 and the positioner 21 toward the center 17 of the hard disk 3 from the outer disk position 18. During the movement of the suspension arm 6 and the positioner 21, the current detector 31 monitors the current, and the position sensor sends the position signal of the positioner 21 to the CPU 34.

The operation proceeds to a block 63 in which the CPU 34 determines as to whether the positioner 21 is moved by a distance $L_4+^0$, or not. The distance $L_4$ is a designed distance between the outer disk position 18 and an inner edge of the load/unload member, as shown in the FIG. 4(b). The current from the voltage source +V to the reference potential is stopped when the positioner 21 is moved by the distance longer than the $L_4$. The distance $^0$ is a predetermined additional distance into which several servo tracks are written. If the answer of the block 63 is YES, it indicates that the number of servo tracks to be written is smaller than a designed value, as shown in a block 64, and the disk drive device is treated as a failed product. In this manner, the block 63 determines as to whether the disk drive device has the load/unload member 5 of the designed size, or not, by determining as to whether the positioner 21 is moved by the distance $L_4+^0$ which is longer than the distance $L_4$, or not. If the answer of the block 63 is NO, the operation proceeds to a block 65 in which the CPU 34 determines as to whether the current flowing from the voltage source +V to the reference potential is turned off, or not. If the current detector 31 detects the turn off of the current due to be disengagement of the front tab member 15 from the load/unload member 5, the current detector 31 sends a signal indicating the turn off of the current to the CPU 34 in the block 65, and the operation proceeds to a block 66. If the answer of the block 65 is NO, the operation returns to the block 63. In the block 66, the CPU 34 stores a position 39' of the positioner 21 as a first servo track position. The operation proceeds to a block 67 in which the CPU 34 controls the pattern read/write circuit 30 to write the servo pattern on the outer most first servo track position, then to move the data read/write head 7 to a next servo track to write the servo pattern on the next servo track. The write operation toward the center 17 of the hard disk 3 is repeated until the servo patterns are written on the #10,000 servo track. The operation proceeds to a block 68 in which the operation is terminated.

Figure 6:
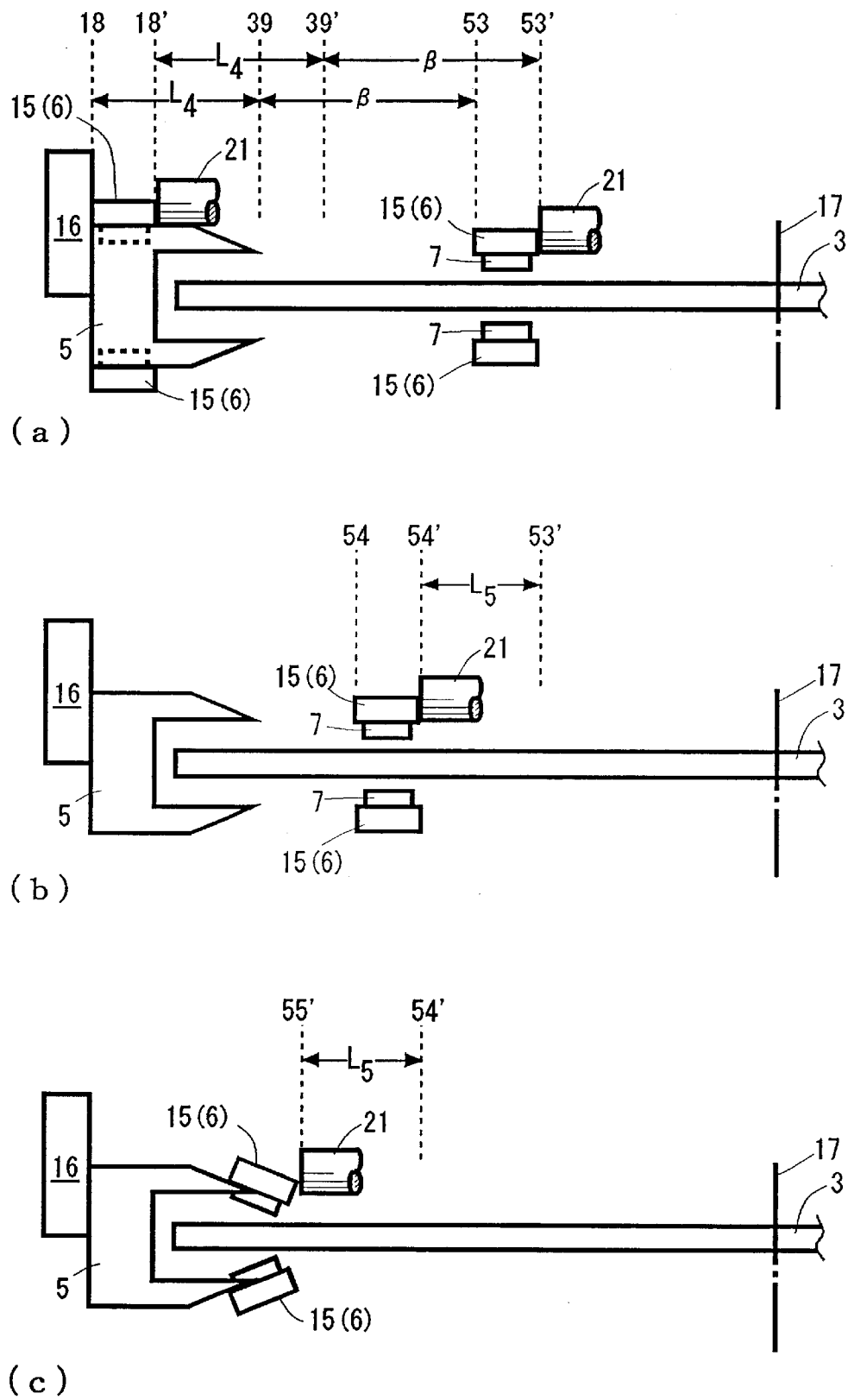
FIG. 6 shows a structure of a third embodiment of the present invention.
Figure 7:
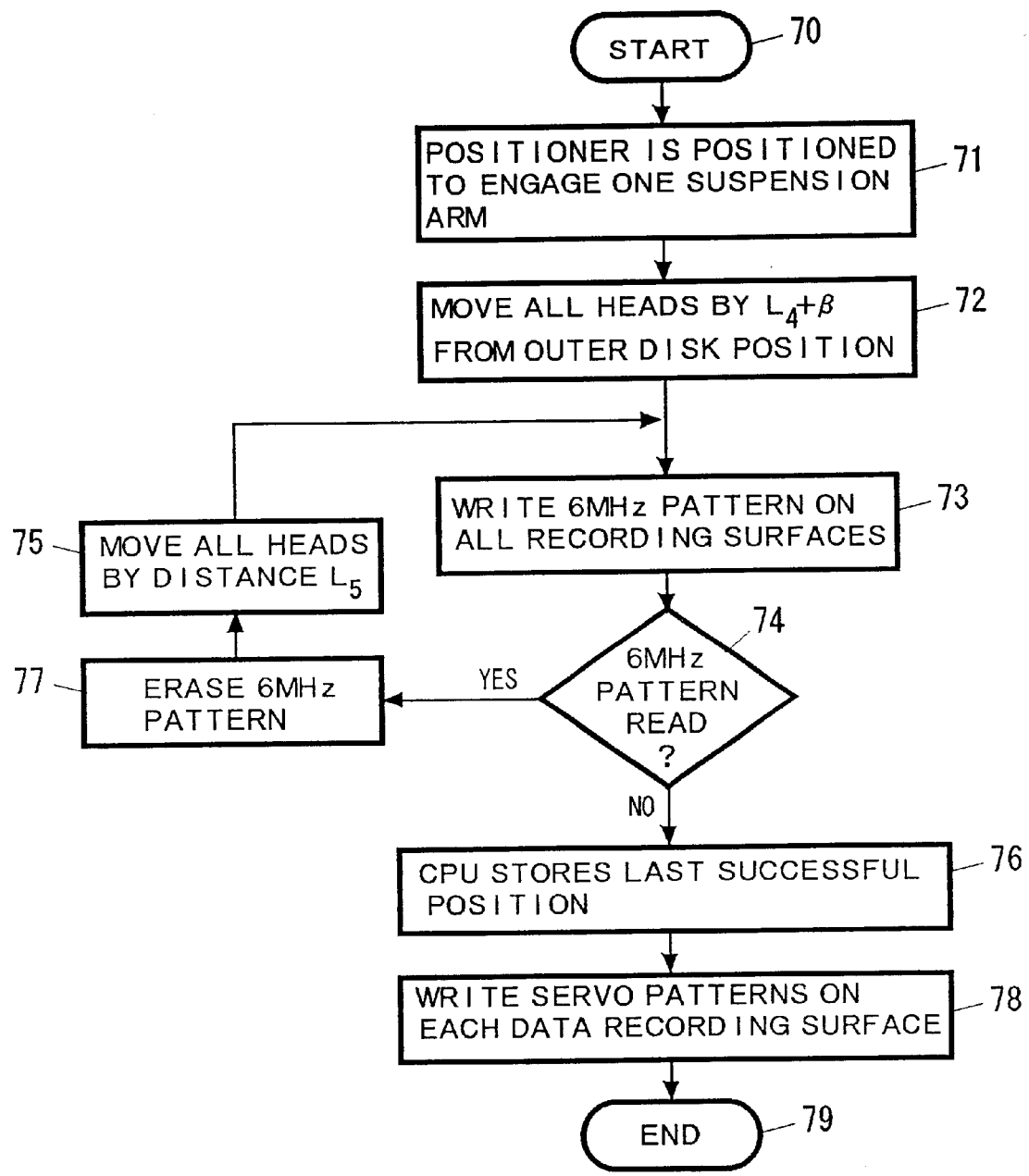
FIG. 7 shows a flow chart of the operation of the third embodiment of the present invention.

The FIGS. 6 and 7 show the operation of a third embodiment for finding a position of a first servo track in accordance with the present invention. The FIGS. 6(*a*), 6(*b*) and 6(*c*) show a structure of the hard disk drive device 1. One hard disk 3 and two data read/write heads 7 are shown for simplify the drawings. It is however assumed that the hard disk drive device 1 include three hard disks 3, i.e. six data recording surfaces, and six data read/write heads 7. The FIG. 7 shows an operational flow chart of the third embodiment. The operation starts at a block 70, and the operation proceeds to a block 71 in which the positioner 21 is positioned to engage with one of the six suspension arms 6. It is noted that the six suspension arms 6 are fixed to each other at the pivot point 9, shown in the FIG. 1, and hence all the suspension arms 6 are moved together when one suspension arm 6 is moved by the positioner 21. The operation proceeds to a block 72 in which the CPU 34 controls the suspension VCM driver 29 and the positioner VCM driver 28 to move the front tab member 15 and the data read/write head 7 of the one suspension arm 6 and the positioner 21 of the servo track writer 2 to the outer disk position 18, as shown in the left side of the FIG. 6(*a*), so that the remaining five suspension arms 6 are also moved, and the CPU 34 controls the suspension VCM driver 29 and the positioner VCM driver 28 to move the front tab member 15 of the one suspension arm 6 and the positioner 21 toward the center 17 of the data recording disk 3 by a distance $L_4+^0$, as shown in the right side of the FIG. 6(*a*), so that the remaining five suspension arms 6 are also moved. The distance $L_{4①@}$ is the distance between the outer disk position 18 and the position 39 of the inner edge of the load/unload member 5, as described with respect to the FIG. 4(*b*), and the distance β is a predetermined distance into which the predetermined number of servo tracks, for example 10 servo tracks, are written. During the movement, the position sensor 23 sends the position signals to the CPU 34, therefore the CPU 34 can detects the movement of the data read/write head 7 by the distance $L_4+β$. When the CPU detects the distance $L_4+β$, the CPU 34 controls the suspension VCM driver 29 and the positioner VCM driver 28 to stop the data read/write head 7 and the one suspension arm 6 and the positioner 21 at the positions 53 and 53', respectively. The stopped position of the data read/write head 7 after the movement by the distance $L_4+β$ is defined as a first test pattern track. At this stage, each of the six data read/write heads 7 is positioned on the first test pattern track of each of the six data recording surfaces, respectively.

The operation proceeds to a block 73 in which the CPU 34 controls the pattern read/write circuit 30 to write a test pattern of 6 MHz on the first test pattern track of each of the six data recording surfaces. The operation proceeds to a block 74 in which the CPU 34 determines as to whether the test patterns on the first test pattern tracks of all the six data recording surfaces are successively read by the pattern read/write circuit 30, or not. If the answer of the block 74 is YES, the operation proceeds to a block 77 in which the CPU 34 controls the pattern read/write circuit 30 to erase the just written test patterns in the block 73, i.e. the test patterns written on the first test pattern tracks of the six data recording surfaces in this case. The operation proceeds to a block 75 in which the CPU 34 controls the suspension VCM driver 29 and the positioner VCM driver 28 to move the data read/write head 7 of the one suspension arm 6 and the positioner 21 by a predetermined distance $L_5$ toward the outer disk position 18 from the positions 53 and 53', respectively to increment the data read/write head 7 from the position 53 to a position 54 and the positioner 21 from the position 53' to a position 54', so that the remaining suspension arms 6 are also moved. The distance $L_4$ is equal to the distance for incrementing the data read/write head 7 to successively write the servo patterns. The incremented position of the data read/write head 7 is a second test pattern track. The operation returns to the block 73 in which the test patterns are written on the second test pattern track of each of the six data recording surfaces, under the control of the CPU 34. The operation proceeds to the block 74 in which the CPU 34 determines as to whether the test patterns on the second test pattern tracks of all the six data recording surfaces are successively read by the pattern read/write circuit 30, or not. The operational loop of the blocks 73, 74, 77 and 75 is repeated until the block 74 generates the answer NO. The FIG. 6(*c*) shows that the pattern read/write circuit 30 fails to read the test pattern from third test pattern tracks of all the data recording surfaces since the front tab members 15 of one of the suspension arms 6, the suspension arm 6 engaged with the positioner 21 for example, rides on the ramp surface of the load/unload member 6 so that the data read/write head 7 is inclined against the data recording surface and is separated from the data recording surface by a distance longer than the designed distance. Therefore, the block 74 generates the answer NO in the case shown in the FIG. 6(*c*). The operation proceeds to a block 76 in which the CPU stores the position of the positioner 21 which positions the data read/write head 7 at the second test pattern track which is the track position just before the track position at which the read/write operation of the test pattern is failed, as a first servo track position. The operation proceeds to a block 78 in which the CPU 34 controls the positioner VCM driver 28, the suspension VCM driver 29 and the pattern read/write circuit 30 to write the servo patterns in a direction toward the inner most position from the first servo track position stored in the block 76 on all the data recording surfaces. The operation terminates at a block 79.

Figure 8:
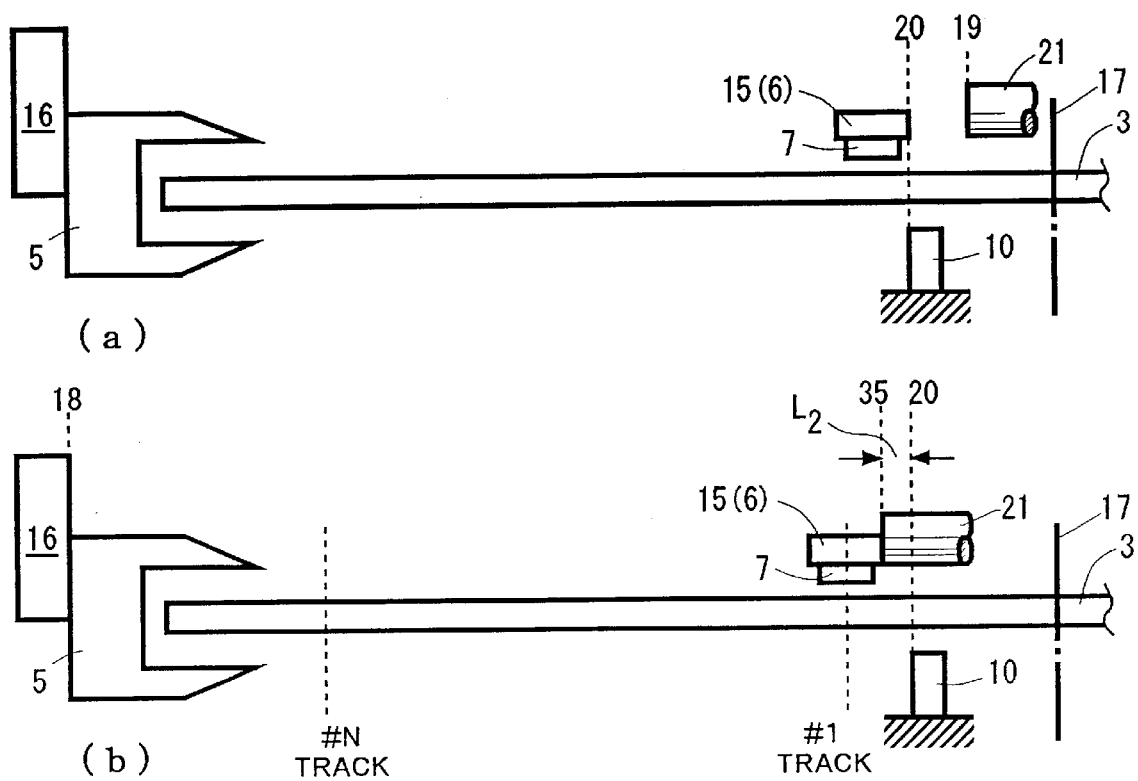
FIG. 8 shows a structure of a fourth embodiment of the present invention.
Figure 9:
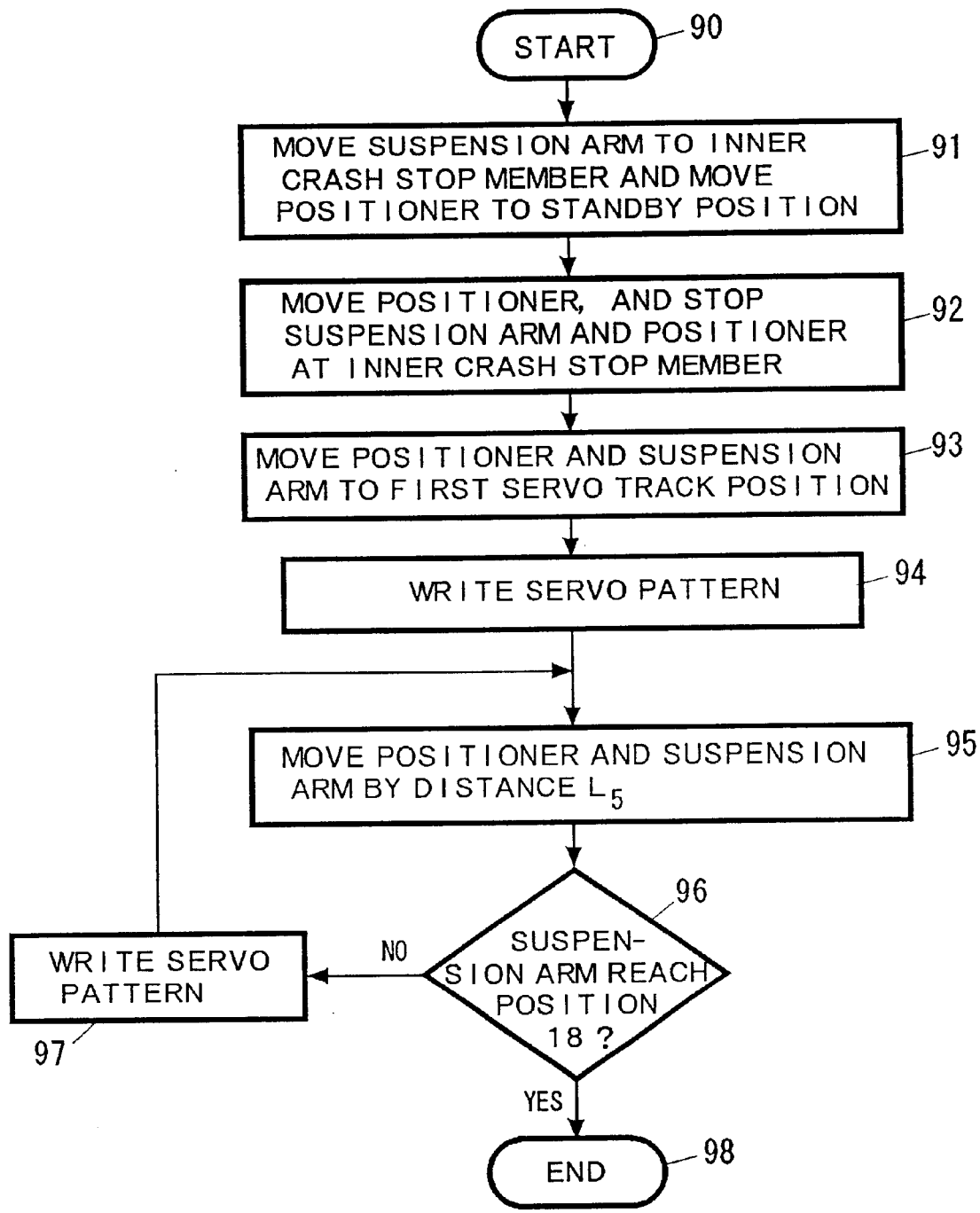
FIG. 9 shows a flow chart of the operation of the fourth embodiment of the present invention.

The FIGS. 8 and 9 show the operation of a fourth embodiment for finding a position of a first servo track in accordance with the present invention. The FIGS. 8(*a*) and 8(*b*) show a structure of the hard disk drive device 1. One hard disk 3 and one data read/write head 7 are shown for simplify the drawings. Actually, the hard disk drive device 1 may include a plurality of hard disks 3 and a plurality of the data read/write heads 7. The FIG. 9 shows an operational flow chart of the fourth embodiment. The operation starts at a block 90, and the operation proceeds to a block 91 in which the CPU 34 controls the suspension VCM driver 29 to stop the suspension arm 6 at the position 20 of the inner crash stop member 10, and the CPU 34 controls the positioner VCM driver 28 to stop the positioner 21 of the servo track writer 2 at the standby position 19, as shown in the FIG. 8(a). The operation proceeds to a block 92 in which the CPU 34 controls the positioner VCM driver 28 to move the positioner 21 toward the suspension arm 6 from the standby position 19. During the movement of the positioner 21, the VCM current monitor 27 monitors the VCM current. When the positioner 21 engages with the suspension stopped at the position 20, the current flowing through the positioner VCM 22 increases. The VCM current monitor 27 detects the VCM current, and sends the signal indicating the VCM current to the CPU 34. The CPU controls the positioner VCM driver 28 to stop the positioner 21 when it engages with the suspension arm 6.

The operation proceeds to a block 93 in which the CPU 34 controls the suspension VCM driver 29 and the positioner VC driver 28 to move them by the distance $L_2$ from the position 20. The distance $L_2$ indicates a width or distance of an inner guard band between the position 20 of the inner crash stop member 10 and the position 35 of the positioner 21 for writing the inner most servo track, as described before with respect to the FIG. 2. The position separated by the distance $L_2$ from the position 20 is the first servo track position. The operation proceeds to a block 94 in which the CPU 34 controls the pattern read/write circuit 30 to write the servo pattern on the first servo track position, as shown in the FIG. 8(b). The operation proceeds to a block 95 in which the CPU 34 controls the suspension VCM driver 29 and the positioner VCM driver 28 to move them by the distance $L_5$ toward the load/unload member 5 from the first servo track position #1. The distance $L_5$ indicates the distance for incrementing the data read/write head 7 from one servo track position to the next servo track position, as described with respect to the FIG. 6. The operation proceeds to a block 96 in which the CPU 34 determines as to whether the positioner 21 is so moved as to move the suspension arm 6 supporting the data read/write head 7 to the outer disk position 18, or not. When the positioner 21 is stopped by the outer stop member 16, the VCM current monitor 27 detects the rapid increase of the VCM current, and sends the signal indicating the VCM current to the CPU 34, whereby the CPU 34 can control the suspension VCM driver 29 and the positioner VCM driver 28 to stop them at the outer disk position 18. If the answer of the block 96 is NO, the operation proceeds to a block 97 in which the servo pattern is written on the servo track position, and the operation returns to the block 95, and the data read/write head 7 is positioned to the next servo track position. The operation of the loop including the blocks 95 through 97 is repeated until the block 96 generates the answer YES. In this manner, the servo patterns are written from the inner most servo track #1 toward the outer disk position 18, as shown in the FIG. 8(b), so that the maximum number of tracks #1 through #N is written. If the answer of the block 96 is YES, the operation terminates at a block 98.

Figure 12:
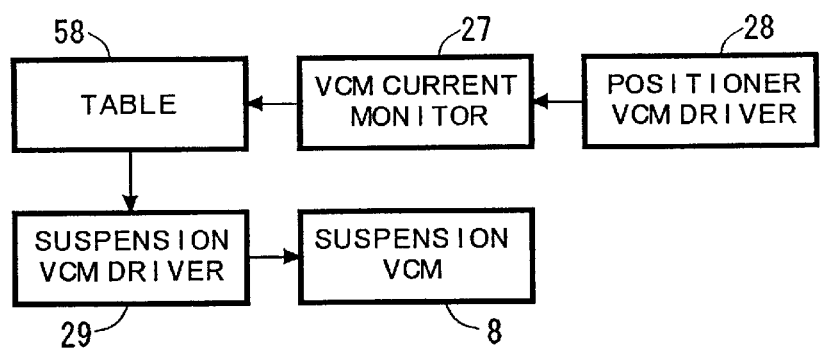
FIG. 12 shows a schematic block diagram used in the fifth embodiment of the present invention.
Figure 10:
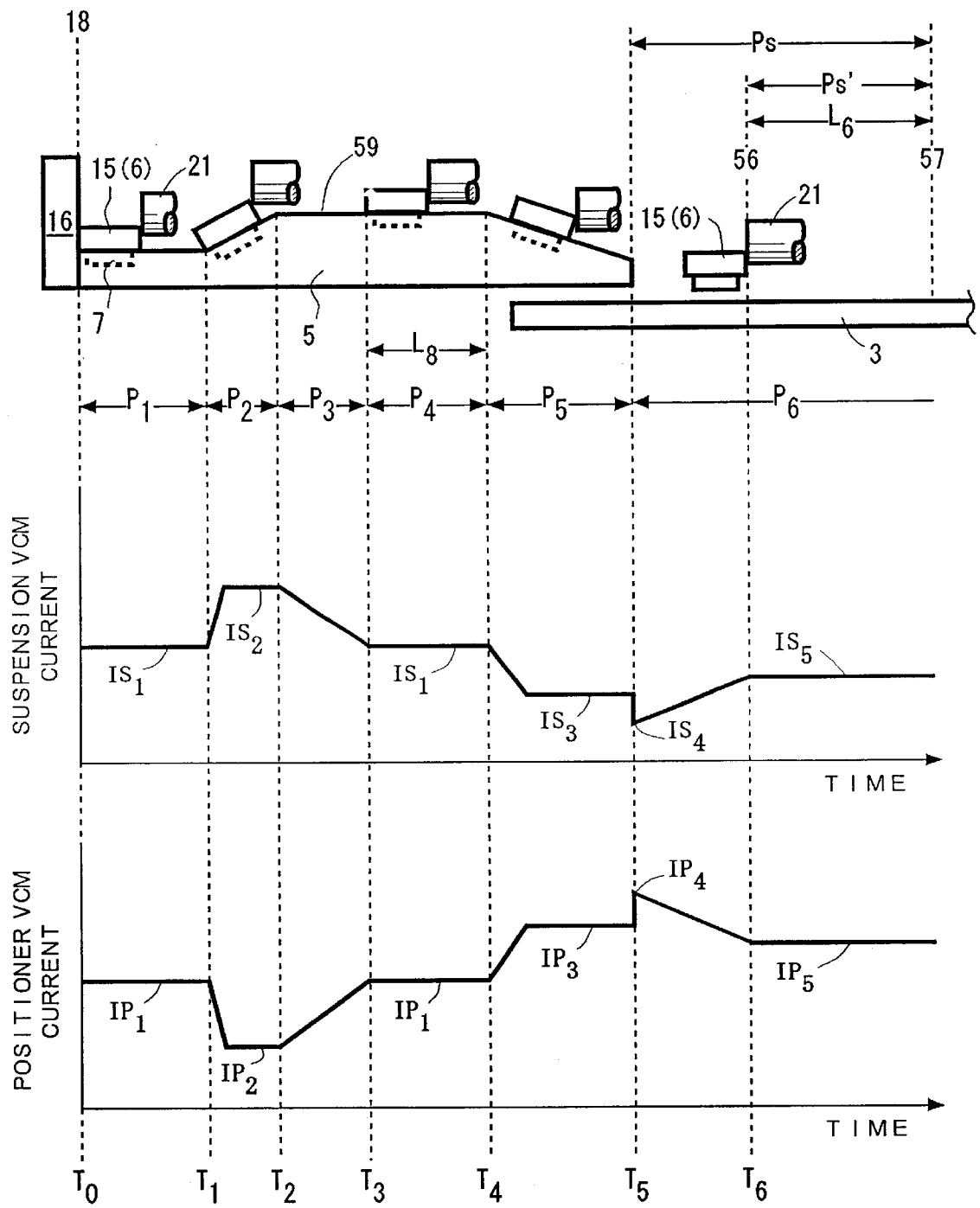
FIG. 10 shows a structure of a fifth embodiment of the present invention.
Figure 11:
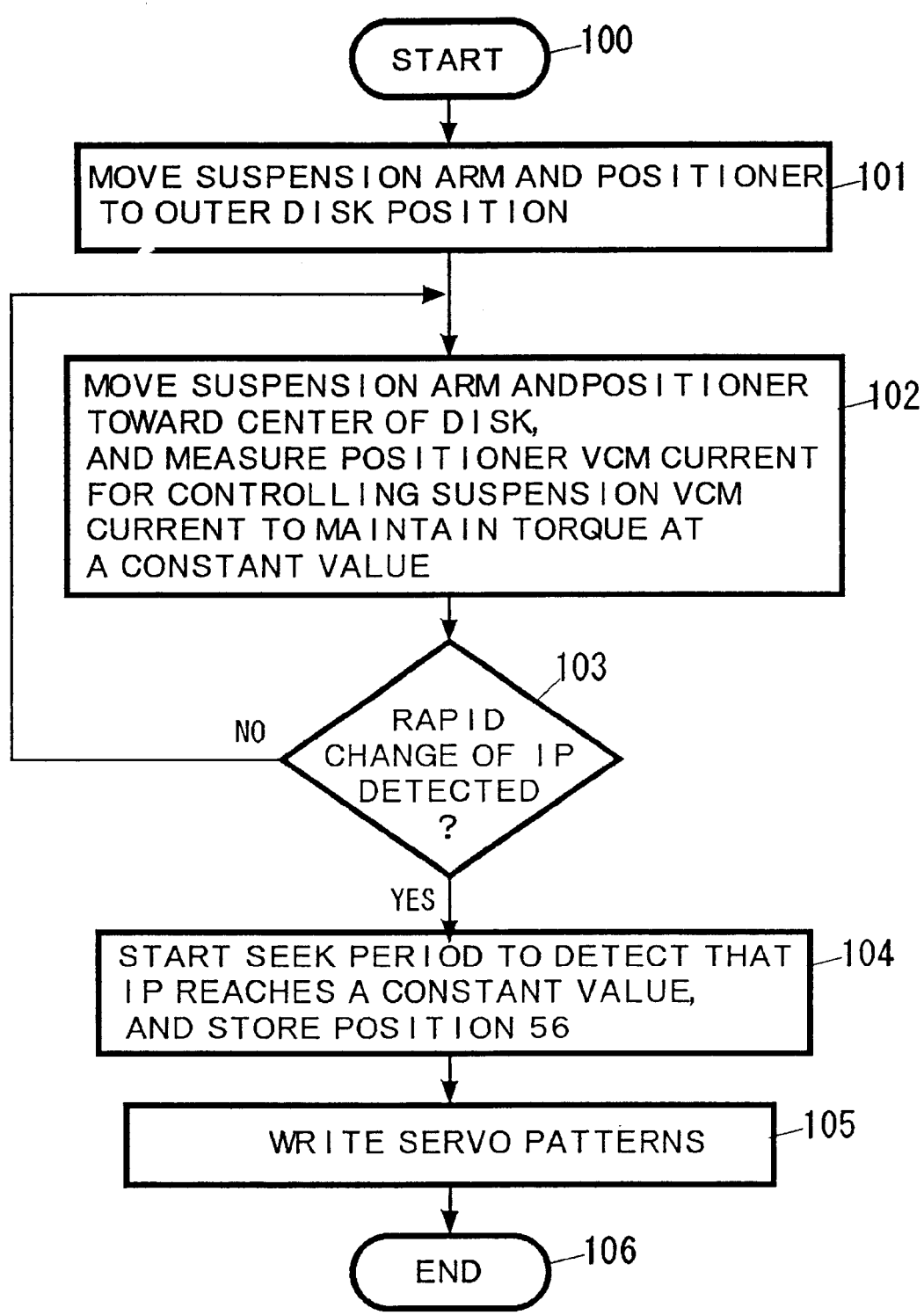
FIG. 11 shows a flow chart of the operation of the fifth embodiment of the present invention.

The FIGS. 10, 11 and 12 show the operation of a fifth embodiment for finding a position of a first servo track in accordance with the present invention. The FIG. 10 shows a detail structure of the load/unload member 5 and various positions of the front tab member 15 and the data read/write head 7 on the surface 59 of the load/unload member 5 and the hard disk 3. One hard disk 3 and one read/write head 7 are shown for simplify the drawings. Actually, the hard disk drive device 1 may include a plurality of hard disks 3 and a plurality of the data read/write heads 7. The FIG. 11 shows an operational flow chart of the fifth embodiment. The operation starts at a block 100, and the operation proceeds to a block 101 in which the CPU 34 controls the suspension VCM driver 29 and the positioner VCM driver 28 to move the front tab member 15 of the suspension arm 6 and the positioner 21 of the servo track writer 2 to the outer disk position 18, as shown in the FIG. 10. The operation proceeds to a block 102 in which the CPU 34 controls the suspension VCM driver 29 and the positioner VCM driver 28 to move the front tab member 15 and the positioner 21 toward the center 17 (not shown in the FIG. 10) of the hard disk 3 from the outer disk position 18. During the movement of the positioner 21, the position sensor 23 sends the position signal of the positioner 21 to the CPU 34, and the VCM current monitor 27 monitors or measures the VCM current IP flowing through the positioner VCM 22 and sends the value of the VCM current IP to the CPU 34. Based upon the value of the VCM current IP, the CPU 34 detects as to whether the current IP of the positioner VCM 22 is being changed, or not. Also, the CPU 34 includes a conversion table 58 as shown in the FIG. 12, and the CPU 34 supplies the value of the VCM current IP to the table 58. The table 58 generates a control signal for controlling the suspension VCM driver 29, a value of which is varied to maintain the VCM current IP flowing through the positioner VCM 22 at a constant value, so that the suspension VCM driver 29 varies the value of the current IS applied to the suspension VCM 8 to maintain a torque or force applied from the suspension arm 6 to the positioner 21 at a constant value.

Describing the control of the current IS applied to the suspension VCM 8 with reference to the wave forms shown in the FIG. 10, at a time $T_0$, the current $IS_1$ is applied to the suspension VCM 8, and the current $IP_1$ is applied to the positioner VCM 22 to move the suspension arm 6 with maintaining the engagement with the positioner 21 and to maintain the torque or force applied from the suspension arm 6 to the positioner 21 at the constant value. The values of the currents $IS_1$ and $IP_1$ is maintained at the constant value during a period $P_1$ between the time $T_0$ and $T_1$ since the front tab member 15 of the suspension arm 6 engages with the first flat portion of the surface 59 during the period $P_1$, so that the force applied from the suspension arm 6 to the positioner 21 is constant.

When the front tab member 15 climbs the slope of the surface 59 during the period $P_{2①@}$ between the time $T_1$ and $T_2$, the force applied from the suspension arm 6 to the positioner 21 decreases, so that the current IP flowing through the positioner VCM 22 decreases. The value of the current IP is sent to the table 58 which controls the suspension VCM driver 29 to increase the value of the current IS of the suspension VCM 8 to the value $IS_②Q$ to maintain the force applied from the suspension arm 6 to the positioner 21 at the constant value at which the current IP reaches the value $IP_2$.

When the front tab member 15 reaches the second flat portion of the surface 59 during the period $P_{3①@}$ between the time $T_2$ and $T_3$, the force applied from the suspension arm 6 to the positioner 21 increases, so that the current IP flowing through the positioner VCM 22 increases. The value of the current IP is sent to the table 58 which controls the suspension VCM driver 29 to decrease the value of the current IS of the suspension VCM 8 to the value $IS_②P$ to maintain the force applied from the suspension arm 6 to the positioner 21 at the constant value at which the current IP reaches the value $IP_1$. And, these values are maintained during the period $P_{4①@}$ between the time $T_3$ and $T_4$.

When the front tab member 15 goes down the slope of the surface 59 during the period $P_5$ between the time $T_4$ and $T_5$' the force applied from the suspension arm 6 to the positioner 21 increases, so that the current IP flowing through the positioner VCM 22 increases. The value of the current IP is sent to the table 58 which controls the suspension VCM driver 29 to decrease the value of the current IS of the suspension VCM 8 to the value $IS_3$ to maintain the force applied from the suspension arm 6 to the positioner 21 at the constant value at which the current IP reaches the value $IP_3$. And, these values are maintained during the period $P_5$.

At the time $T_5$, the front tab member 15 of the suspension arm 6 disengages with the inner edge of the load/unload member 5, and flies above the data recording surface of the hard disk 3, so that the force applied from the suspension arm 6 to the positioner 21 rapidly increases, and the current IP flowing through the positioner VCM 22 rapidly changes from the value $IP_3$ to the $IP_4$. The CPU 34 detects this rapid increase or leading edge of the current IP from the value $IP_3$ in a predetermined short period in a block 103 shown in the FIG. 11, and starts a seek period $P_S$ of a predetermined length from the time $T_5$ in a block 104. The length of the seek period $P_S$ is selected to include a period $P_S'$ corresponding to a length $L_{6①@}$ which is longer than the length $L_8$ of the longest flat portion of the surface 59 during which the constant current $IS_1$ is generated.

Returning to the operation at the time $T_5$, the current value $IP_{4①@}$ is sent to the table 58 which controls the suspension VCM driver 29 to rapidly decrease the value of the current IS of the suspension VCM 8 to the value $IS_4$, then gradually increases the current IS toward the value $IS_5$ during the seek period $P_S$ to maintain the force applied from the suspension arm 6 to the positioner 21 at the constant value at which the current IP reaches the value $IP_5$. And, these values are maintained during the period $P_{6①@}$ for writing the servo patterns on a plurality of servo tracks. The CPU 34 detects that the current IP reaches the value $IP_5$ at the time $T_6$, and controls to continuously move the suspension arm 6 and the positioner 21 toward the center of the hard disk 3 during the period $P_S'$ or the distance $L_6$. If the constant current $IP_5$ is continuously detected during the period $P_S'$, it indicates that the data read/write head 7 is moving on the data recording surface, therefore the CPU 34 can detects that the data read/write head 7 is flying on the hard disk 3. That is, the length $L_6$ is selected to determine as to whether the data read/write head 7 is positioned on the data recording surface, or not. After the data read/write head 7 is moved to the position 57, the CPU 34 controls the positioner VCM driver 28 and the suspension VCM driver 29 to return the data read/write head 7 to the position 56. In a block 105, the CPU 34 controls the positioner VCM driver 28, the suspension VCM driver 29 and the pattern read/write circuit 30 to write the servo patterns on all the servo tracks from the first servo track position 56. The operation terminates at a block 106.

The FIGS. 13 through 16 show a sixth embodiment of the present invention which senses the stop of the power from the power supply to return the clock read/write head 24 of the servo track writer 2 and the data read/write head 7 of the hard disk drive device 1 to their stand by position, so that the sticking action of the clock read/write head 24 and the data read/write head 7 onto the hard disk 3 is prevented. FIG. 13 shows a detail of the drive device 25 for moving the clock read/write head 24 in a vertical direction to the surface of the hard disk 3. A chamber 110 is provided with a first port 111 into which an pressurized air is supplied from a pressurized air source 115, a second port 112 connected to a first port of a rotary cylinder 120, a third port 113 connected to a second port of the rotary cylinder 120, an air duct 114 which is moved by a rod 116 of a solenoid valve 128, and a spring 117 which pulls the air duct 114 to bias it in a direction of an arrow 119 (FIG. 14). The rotary cylinder 120 includes a moving member 121 fixed on a shaft 122 and a stopper 123. A cam 124 is fixed on the shaft 122. A supporting member 125 supporting the clock read/write head 24 is supported on a member 126 to reciprocally move in a direction of an arrow 129 or an arrow 130 (FIG. 14(b)). A spring 127 which pulls the member 125 to bias it in the direction of the arrow 130 (FIG. 14(b)).

During that the power to the servo track writer 2 and the disk drive device 1 is supplied, the solenoid valve 128 moves the rod 116 in a direction of an arrow 118 against the force of the spring 117 to move the air duct 114 to connect the first port 111 to the second port 112, so that the pressurized air is supplied into the second port 112, whereby the moving member 121 and the shaft 122 are rotated in a counter clockwise direction until it is stopped by the stopper 123, as shown in the FIG. 13(a). As the shaft 122 is rotated, the cam 124 fixed on the shaft 122 is rotated in the counter clockwise direction, so that a highest point or a first cam surface of the cam 124 moves the supporting member 125 in the direction of the arrow 129, whereby the clock read/write head 24 is biased toward the data recording surface of the hard disk 3. Since the hard disk 3 is now rotated, the clock read/write head 24 biased toward the data recording surface is separated by a distance $D_1$ from the data recording surface due to an air bearing effect. The distance $D_1$ between the clock read/write head 24 and the data recording surface is required to write the clock pattern on the data recording surface or to read the clock pattern.

Referring to the FIG. 14, when the power to the servo track writer 2 and the disk drive device 1 is turned off due to a power cut, the solenoid valve 128 is deactivated, and the spring 117 moves the air duct 114 in the direction of the arrow 119, so that the pressurized air is supplied into the third port 113, whereby the moving member 121 and the shaft 122 are rotated by about 270 degrees from the position shown in the FIG. 13(a) in the clockwise direction and is stopped by the stopper 123, as shown in the FIG. 14(a). As the shaft 122 is rotated, the cam 124 fixed on the shaft 122 is rotated in the clockwise direction. As the cam 124 is rotated, the supporting member 125 and the clock read/write head 24 is gradually moved in the direction of the arrow 130 until a lowest point or a second cam surface of the cam 124 engages with the supporting member 125, as shown in the FIG. 14(b) and the clock read/write head 24 is moved to a retract position or the standby position separated by a distance $D_2$ from the data recording surface. The distance $D_2$ sufficiently prevents the clock read/write head 24 from being stuck on the data recording surface when the power is turned off.

Figure 15:
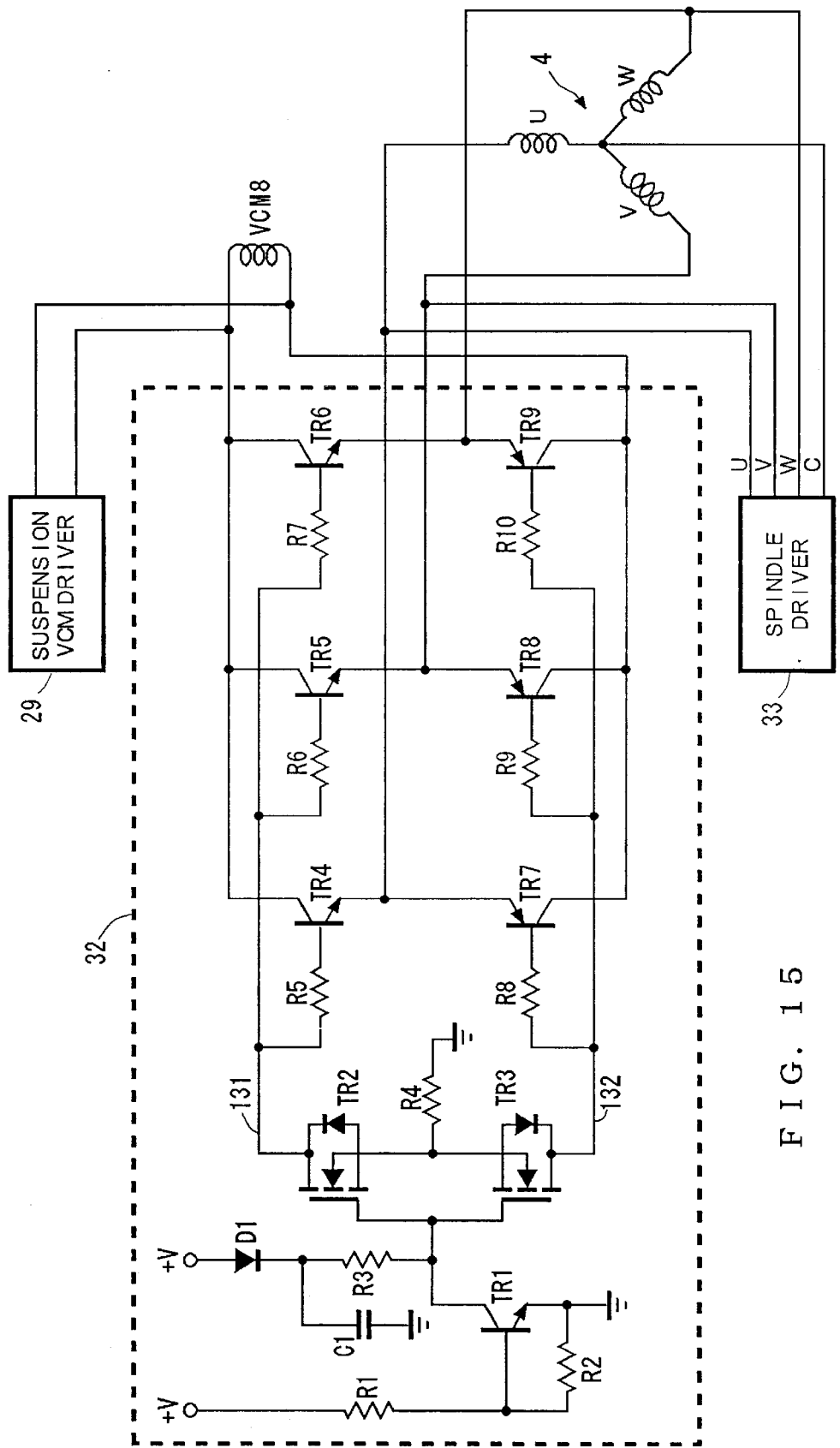
FIG. 15 shows a schematic circuit diagram used in the sixth embodiment of the present invention.
Figure 16:
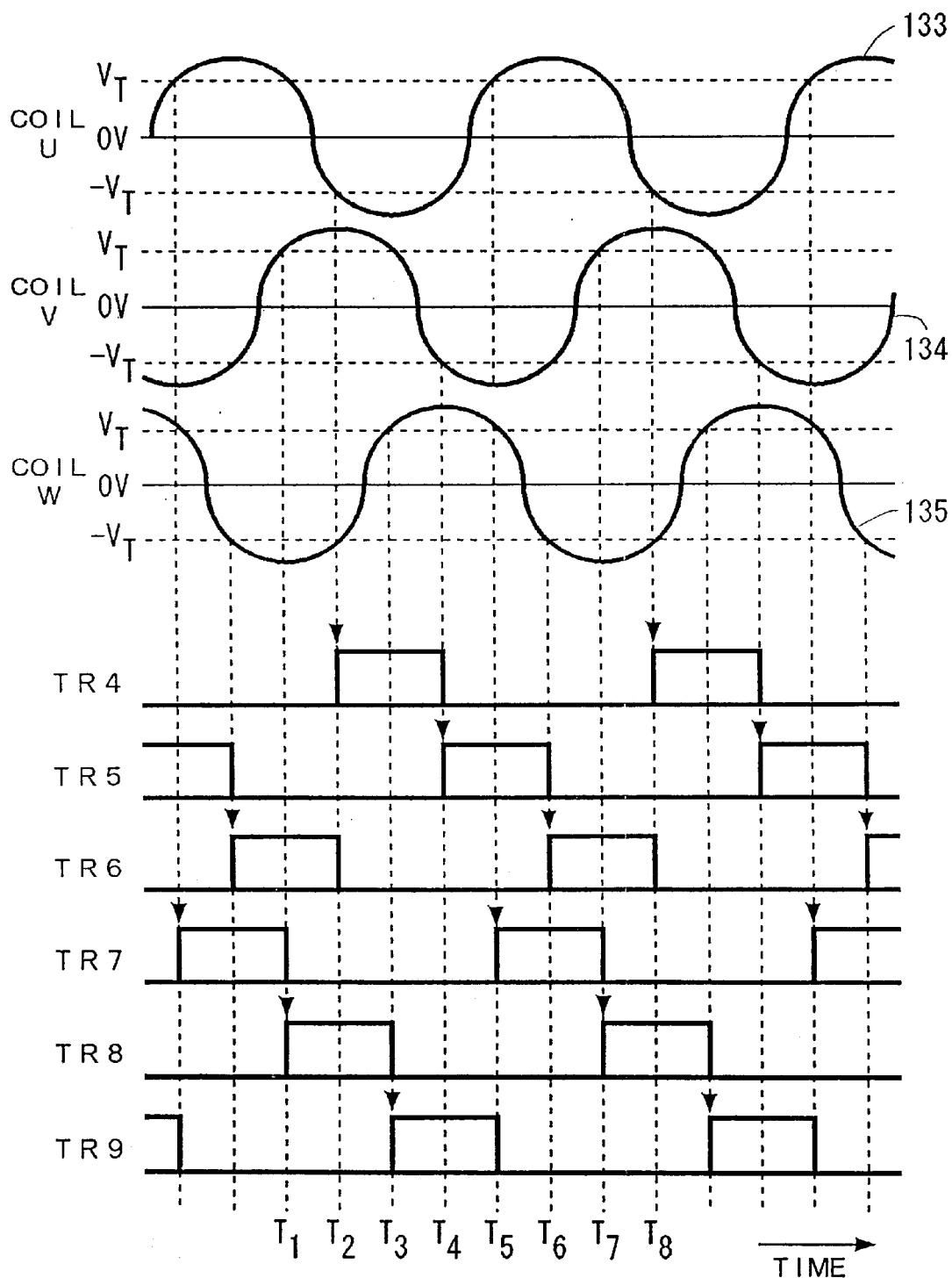
FIG. 16 shows waveforms generated in the circuit shown in the FIG. 15.

The FIG. 15 shows a detail of the power off retract circuit 32 for activating the suspension VCM 8 to move suspension arm 6 and the data read/write head 7 to the outer disk position 18 on the load/unload member 5 described before when the power to the servo track writer 2 and the disk drive device 1 is turned off due to the power cut. When the power is supplied, the positive voltage +V is supplied to an anode of a diode D1 and one terminal of a resistor R1, so that a transistor TR1 is turned on, and a collector of the transistor TR1 is connected to a reference potential or ground potential, whereby MOS FETs TR2 and TR3 are turned off, and all the transistors TR4 through TR9 are turned off. And, a capacitor C1 is charged during power on. That is, during the power on, the power off retract circuit 32 is not operated, and the coils U, V and W of the spindle motor 4 is disconnected from the suspension VCM 8, and the spindle motor 4 is controlled by the spindle driver 33.

When the power is turned off, the positive voltage +V to the diode D1 and the resistor R1 is turned off, so that the transistor TR1 is turned off, and the charges stored in the capacitor C1 are applied to the gate electrodes of the MOS FETs TR2 and TR3 to turn them on, whereby lines 131 and 132 are maintained at the ground potential until the capacitor C1 is discharged. At the turn off of the power, the coils U, V and W of the spindle motor 4 start to generate the counter electromotive force, as shown by the voltage wave forms 133, 134 and 135 in the FIG. 16, each of which is separated by 120 degrees. For simplifying the description, the time $T_1$ through $T_7$ are shown in the FIG. 16. At the time $T_1$, the counterelectromotive force of the coil V exceeds a threshold voltage VT of the transistor TR8, and the transistor TR8 is turned on during the time $T_1$ through $T_3$. At the time $T_2$, the counterelectromotive force of the coil U exceeds a threshold voltage $-V_T$ of the transistor TR4, and the transistor TR4 is turned on during the time $T_2$ through $T_4$. Both the transistors TR4 and TR8 are turned on during a period between the time $T_2$ and $T_3$, and the current flows from the maximum voltage of the coil V to the minimum voltage of the coil U through the transistor TR8, the spindle VCM 8 and the transistor TR4. The current flowing through the suspension VCM 8 moves the suspension arm 6 toward the outer disk position 18 on the load/unload member 5.

At the time $T_3$, the counterelectromotive force of the coil exceeds the threshold voltage $V_T$ of the transistor TR9, and the transistor TR9 is turned on during the time $T_3$ through $T_5$. At the time $T_4$, the counterelectromotive force of the coil V exceeds the threshold voltage $-V_T$ of the transistor TR5, and the transistor TR5 is turned on during the time $T_4$ through $T_6$. Both the transistors TR5 and TR9 are turned on during a period between the time $T_4$ and $T_5$, and the current flows from the maximum voltage of the coil W to the minimum voltage of the coil V through the transistor TR9, the spindle VCM 8 and the transistor TR5. The current flowing through the suspension VCM 8 moves the suspension arm 6 toward the outer disk position 18 on the load/unload member 5.

At the time $T_5$, the counterelectromotive force of the coil U exceeds a threshold voltage $V_T$ of the transistor TR7, and the transistor TR7 is turned on during the time $T_5$ through $T_7$. At the time $T_6$, the counterelectromotive force of the coil W exceeds the threshold voltage $-V_T$ of the transistor TR6, and the transistor TR6 is turned on during the time $T_6$ through $T_8$. Both the transistors TR6 and TR7 are turned on during a period between the time $T_6$ and $T_7$, and the current flows from the maximum voltage of the coil U to the minimum voltage of the coil W through the transistor TR7, the spindle VCM 8 and the transistor TR6. The current flowing through the suspension VCM 8 moves the suspension arm 6 toward the outer disk position 18 on the load/unload member 5.

The above operation is repeated until the amplitude of the waveforms 133, 134 and 135 decreases below the threshold value $V_T$ and $-V_T$ of the transistors TR4 through TR9, or the turn on of the MOS FETs TR2 and TR3 is terminated due to the termination of the discharge of the capacitor C1. It is noted the parameters, such as the level of the counterelectromotive force and the rotative speed of the spindle motor 4 is selected to return the suspension arm 6 to the outer disk position or the standby position 18 on the load/unload member 5 during the above operation.

In this manner, the suspension arm 6 is moved to the outer disk position 18 of the load/unload member 5 by the counterelectromotive force generated by the coils U, V and W of the spindle motor 4 after the power off to the spindle motor 4 whereby the sticking action of the data read/write head 7 onto the data recording surface is prevented.

INDUSTRIAL APPLICABILITY

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention and the claims. For example, although the embodiments describe the servo write operation beginning at the inner track and proceeding to the outer track of the disk, servo write operations beginning at the outer track and proceeding to the inner track provide another embodiment, which are also recited within the claims. It is therefore contemplated that such modifications can be made without departing from the spirit or scope of the present invention as defined in the appended claims.

What is claimed is:

1. A method for writing servo patterns on a da a recording disk of a disk drive device, said method comprising:
    (a) stopping a read/write head at a reference position on said data recording disk;
    (b) moving said read/write head along a radial direction of said data recording disk from said reference position;
    (c) determining whether said data recording disk has a sufficient width along said radial direction to write a predetermined number of servo tracks; and
    (d) writing said servo patterns on said servo tracks if said determining step indicates that data recording disk has said sufficient width.

2. A method for writing servo patterns on a data recording disk according to claim 1, wherein aid reference position is defined by an inner crash stop member.

3. A method for writing servo patterns on a data recording disk according to claim 1, wherein said step (b) moves said read/write head along said radial direction of said data recording disk from said reference position by a predetermined distance for writing a predetermined number of servo tracks.

4. A method for writing serve patterns on a data recording disk according to claim 3, wherein said read/write head is moved by a positioner of a servo track writer which engages with a suspension arm supporting said read/write head.

5. A method for writing servo patterns on a data recording disk according, to claim 3, wherein said step (c) writes a test pattern on said data recording disk by said read/write bead after said read/write head is moved by said predetermined distance and reads said test pattern by said read/write head.

6. A method for writing servo patterns on a data recording disk of a disk drive device which includes a load/unload member located on a periphery of said data recording disk, said method comprising:
    (a) stopping a read/write head at an outer disk position on said load/unload member;
    (b) moving said read/write head along a radial direction of said data recording disk from said outer disk position toward a reference position on said data recording disk;
    (c) stopping said read/write head at said reference position;
    (d) moving said read/write head along a radial direction of said data recording disk from said reference position toward said load/unload member;
    (e) determining whether said data recording disk has a sufficient width along said radial direction to write a predetermined number of servo tracks; and (f) writing said servo patterns on said servo tracks if said determining step indicates that said data recording surface has said sufficient width.

7. A method for writing servo patterns on a data recording disk according to claim 6, wherein said reference position is defined by an inner crash stop member.

8. A method for writing servo patterns on a data recording disk according to claim 6, wherein said step (d) moves said read/write head along said radial direction of said data recording disk from said reference position, by a predetermined distance for writing a predetermined number of servo tracks.

9. A method for writing servo patterns on a data recording disk according to claim 8, wherein said step (e) writes a test pattern on said data recording disk by said read/write head after said read/write head is moved by said predetermined distance and reads said test pattern by said read/write head.

10. A method for writing servo patterns on a data recording disk of a disk drive device in which an electrically conductive suspension arm supporting a read/write head is connected to one terminal of a voltage source and an electrically conductive load/unload member located on a periphery of said data recording disk is connected to the other terminal of said voltage source, said method comprising:

(a) stopping said read/write head at an outer disk position on said load/unload member;
    (b) moving said read/write head along a radial direction of said data recording disk toward a center of said data recording disk from said outer disk position and monitoring a current flowing between said one terminal and said the other terminal;
    (c) detecting a turn off of said current to stop the movement of said read/write head and defining a stopped position of said read/write head as a first servo track position; and
    (d) writing servo pattern on said data recording disk said from first servo track position.

11. A method for writing servo patterns on a data recording disk according to claim 10 wherein a determination is made in said step (c) as to whether said read/write head is moved by a predetermined distance which is larger than a distance between said outer disk position and an inner edge of said load/unload member.

12. A method for writing servo patterns on a data recording disk of a disk drive device which includes a load/unload member located on a periphery of said data recording disk, said method comprising:

(a) stopping a read/write head at an outer disk position on said load/unload member;
    (b) moving said read/write head from said outer disk position along a radial direction of said data recording disk by a first predetermined distance to position said read/write head onto a position of said data recording disk;
    (c) writing a test pattern on said position of said data recording disk;
    (d) determining whether said test pattern on said position is successfully read;
    (e) moving said read/write head from said position to a next position toward said load/unload member by a second predetermined distance which is equal to a distance to move said read/write head from one servo track to a next servo track if the test pattern is successfully read in said step (d);
    (f) repeating said steps (c) through (e) until said read of said test pattern in said step (d) is failed;
    (g) selecting the position just before the position at which said read of said test pattern is failed, as a first servo track position of a plurality of sequential servo track positions;
    (h) writing servo pattern on said data recording disk from said first servo track position to each subsequent servo track position of said plurality of sequential servo track positions.

13. A method for writing servo patterns on a data recording disk according to claim 12 comprising the following step (g') between said step (g) and said step (h), (g') erasing said test patterns written in said step (c).

14. A method for writing servo patterns on a data recording disk via disk drive device which includes a load/unload member located on a periphery of said data recording disk and an inner crash stop member, comprising steps of:

(a) stopping a read/write head at said inner crash stop member;
    (b) moving said read/write head to a position separated from said inner crash stop member by a predetermined distance, defining said position as a first servo track position, and writing a servo pattern on said first servo track position;
    (c) moving said read/write head to a next position separated by a distance to move said read/write head from one servo track to a next servo track;
    (d) determining as to whether said read/write head reaches an outer disk position on said load/unload member;
    (e) writing said servo pattern on said next position in said step (c) if said read/write head does not reach said outer disk position; and
    (f) repeating said steps (c) though (e) until said read/write head reaches said outer disk position.

15. A method for writing servo patterns on a data recording disk of a disk drive device which includes a load/unload member located on a periphery of said data recording disk and an suspension arm supporting a read/write head driven by a suspensions drive device, comprising steps of:

(a) applying a current to a positioner drive device for moving a positioner until said positioner engages with said suspension arm stopped on said load/unload member;
    (b) controlling a current applied to said positioner drive device and a current applied to said suspension drive device to move said suspension arm toward said data recording disk with maintaining said engagement of said positioner with said suspension arm;
    (c) detecting a changce of current flowing through said positioner drive device caused by a disengagement of said suspension arm from an inner edge of said load/unload member;
    (d) detecting a position of said read/write head on said data recording disk at which said current applied to said positioner drive device becomes a constant value; and
    (e) writing servo patterns on said data recording disk from said detected position.

16. A method for writing servo patterns on a data recording disk according to claim 15, wherein said step (a) applies said current applied to said positioner drive device until said positioner engages with said suspension arm stopped at an outer disk position on said load/unload member.

17. A method for writing servo patterns on a data recording disk according to claim 16, wherein said current flowing through said positioner drive device is detected, and the detected current value is used to control said current flowing through said suspension drive device to maintain a force applied from said suspension arm to said positioner at a constant value during the movement of said suspension arm and said positioner.

18. A method for writing servo patterns on a data recording disk according to claim 17, wherein a determination is made as to whether said constant value of said current flowing through said positioner drive device is maintained over a distance above said data recording disk which is longer that a distance of a flat portion of said load/unload member.

19. An apparatus for writing servo patterns on a data recording disk of a disk drive device, comprising:
    (a) means for stopping a read/write head at a reference position said data recording disk;
    (b) means for moving said read/write head along a radial direction of said data recording disk from said reference position;
    (c) means for determining as to whether said data recording disk has a sufficient width along said radial direction to w rite a predetermined number of servo tracks, or not; and
    (d) means for writing said servo patterns on said servo tracks only if said data recording disk has said sufficient width.

20. An apparatus for writing servo patterns on a data recording disk according to claim 19, wherein said reference position is defined by an inner crash stop member.

21. An apparatus for writing servo patterns on a data recording disk according to claim 19, wherein said means (b) moves said read/write head along said radial direction of said data recording disk from said reference position by a predetermined distance for writing a predetermined number of servo tracks.

22. An apparatus for writing servo patterns on a data recording disk according to claim 21, wherein said read/write head is moved by a positioner of a servo track writer which engages with a suspension arm supporting said read/write head.

23. An apparatus for writing servo patterns on a data recording disk according to claim 21, wherein said means (c) writes a test pattern on said data recording disk by said read/write head after said read/write head is moved by said predetermined distance and reads said test pattern by said read/write head.

24. An apparatus for writing servo patterns on a data recording disk of a disk drive device which includes a load/unload member located on a periphery of said data recording disk, comprising:
    (a) means for stopping a read/write head at an outer disk position on said load/unload member;
    (b) means for moving said read/write head along a radial direction of said data recording disk from said outer disk position toward a reference position on said data recording disk;
    (c) means for stopping said read/write head at said reference position;
    (d) means for moving said read/write head along a radial direction of said data recording disk from said reference position toward said load/unload member;
    (e) means for determining as to whether said data recording disk has a sufficient width along said radial direction to write a predetermined number of servo tracks, or not; and
    (f) means for writing said servo patterns on said servo tracks if said data recording surface has said sufficient width.

25. An apparatus for writing servo patterns on a data recording disk according to claim 24, wherein said reference position is defined by an inner crash stop member.

26. An apparatus for writing servo patterns on a data recording disk according to claim 24, wherein said means (d) moves said read/write head along said radial direction of said data recording disk from said reference position by a predetermined distance for writing a predetermined number of servo tracks.

27. An apparatus for writing servo patterns on a data recording disk according to claim 26, wherein said means (e) writes a test pattern on said data recording disk by said read/write head after said read/write head is moved by said predetermined distance and reads said test pattern by said read/write head.

28. An apparatus for writing servo patterns on a data recording disk of a disk drive device in which an electrically conductive suspension arm supporting a read/write head is connected to one terminal of a voltage source and an electrically conductive load/unload member located on a periphery of said data recording disk is connected to the other terminal of said voltage source, comprising:
    (a) means for stopping said read/write head at an outer disk position on said load/unload member;
    (b) means for moving said read/write head along a radial direction of said data recording disk toward a center of said data recording disk from said outer disk position and monitoring a current flowing between said one terminal and said the other terminal;
    (c) means for detecting a turn off of said current to stop the movement of said read/write head and defining a stopped position of said read/write head as a first servo track position; and
    (d) means for writing servo pattern on said data recording disk from said first servo track position.

29. An apparatus for writing servo patterns on a data recording disk according to claim 28 wherein a determination is made in said means (c) as to which said read/write head is moved by a predetermined distance which is larger than a distance between said outer disk position and an inner edge of said load/unload member.

30. An apparatus for writing servo patterns on a data recording disk of a disk drive device which includes a load/unload member located on a periphery of said data recording disk, comprising:
    (a) means for stopping a read/write head at an outer disk position on said load/unload member;
    (b) means for moving said read/write head from said outer disk position along a radial direction of said data recording disk by a first predetermined distance to position said read/write head onto a position of said data recording disk;
    (c) means for writing a test pattern on said position of said data recording disk;
    (d) means for determining as to whether said test pattern on said position is successfully read;
    (e) means for moving said read/write head from said position to a next position toward said load/unload member by a second predetermined distance which is equal to a distance to move said read/write head from one servo track to a next servo track if the test pattern is successfully read in said means (d);
    (f) means for repeating the operation of said means (c) through (e) until said read of said test pattern in said means (d) is failed;

(g) means for selecting the position just before the position at which said read of said test pattern is failed, as a first servo track position; and (h) means for writing servo pattern on said data recording disk from said first servo track position.

31. An apparatus for writing servo patterns on a data recording disk according to claim 30 comprising means for erasing said test patterns written in said means (c).

32. An apparatus for writing servo patterns on a data recording disk of a disk drive device which includes a load/unload member located on a periphery of said data recording disk and an inner crash stop member, comprising:

(a) means for stopping a read/write head at said inner crash stop member;

(b) means for moving said read/write head to a position separated from said inner crash stop member by a predetermined distance, defining said position as a first servo track position, and writing a servo pattern on said first servo track position;

(c) means for moving said read/write head to a next position separated by a distance to move said read/write head from one servo track to a next servo track;

(d) means for determining as to whether said read/write head reaches an outer disk position on said load/unload member;

(e) means for writing said servo pattern on said next position in said means (c) if said read/write head does not reach said outer disk position; and (f) means for repeating the operation of said means (c) though (e) until said read/write head reaches said outer disk position.

33. An apparatus for writing servo patterns on a data recording disk of a disk drive device which includes a load/unload member located on a periphery of said data recording disk and a suspension arm supporting a read/write head driven by a suspension drive device, comprising:

(a) means for applying a current to a positioner drive device for moving a positioner until said positioner engages with said suspension arm stopped on said load/unload member;

(b) means for controlling a current applied to said positioner drive device and a current applied to said suspension drive device to move said suspension arm toward said data recording disk with maintaining said engagement of said positioner with said suspension arm;

(c) means for detecting a change of current flowing through said positioner drive device caused by a disengagement of said suspension arm from an inner edge of said load/unload member;

(d) means for detecting a position of said read/write head on said data recording disk at which said current applied to said positioner drive device becomes a constant value; and (e) means for writing servo patterns on said data recording disk from said detected position.

34. An apparatus for writing servo patterns on a data recording disk according to claim 33, wherein said means (a) applies said current applied to said positioner drive device until said positioner engages with said suspension arm stopped at an outer disk position on said load/unload member.

35. An apparatus for writing servo patterns on a data recording disk according to claim 34, wherein said current flowing through said positioner drive device is detected, and the detected current value is used to control said current flowing through said suspension drive device to maintain a force applied from said suspension arm to said positioner at a constant value during the movement of said suspension arm and said positioner.

36. An apparatus for writing servo patterns on a data recording disk according to claim 35, wherein a determination is made as to whether said constant value of said current flowing through said positioner drive device is maintained over a distance above said data recording disk which is longer than a distance of a flat portion of said load/unload member.

37. A servo track writer for writing servo patterns on a data recording disk of a disk drive device, comprising:

a clock read/write head for writing clock patterns on said data recording disk; and a drive device for moving said clock read/write head between an operational position for writing said clock patterns and a standby position retracted from said operational position;

said drive device comprising:

a cylinder means including a first port and a second port for moving a moving member to a first position when an air is supplied to said first port and moving said moving member to a second position when said air is supplied to said second port;

means for supplying said air to said first port when a power is supplied to said disk drive device and said servo track writer and for supplying said air to said second port when said power is turned off; and a supporting member coupled to said moving member of said cylinder means for moving said clock read/write head to said operational position when said moving member is moved to said first position and for moving said clock read/write head to said standby position when said moving member is moved to said second position.

38. A servo track writer for writing servo patterns on a data recording disk, according to claim 37, wherein said; moving member is fixed on a shaft rotatably mounted in said cylinder means, said moving member is rotated between said first position and said second position, and a cam including a first cam surface and a second cam surface is fixed on said shaft.

39. A servo track writer for writing servo patterns on a data recording disk, according to claim 38, wherein said supporting member moves said clock read/write head to said operational position when said supporting member engages with said first cam surface, and said supporting member moves said clock read/write head to said standby position when said supporting member engages with said second cam surface.

40. A servo track writer for writing servo patterns on a data recording disk of a disk drive device including a suspension arm supporting a read/write head, a suspension drive device for moving said suspension arm between a inner most position and an outer disk position along a radial direction of said data recording disk and a spindle motor for rotating said data recording disk, comprising:

a circuit means connected between said suspension drive device and said spindle motor for responding to a turn off of power applied to said disk drive device and said servo track writer to connect windings of said spindle motor to said suspension drive device to apply counterelectromotive force generated in said windings to said suspension drive device to move said suspension arm to said outer disk position.

41. A servo track writer for writing servo patterns on a data recording disk of a disk drive device including a suspension arm supporting a read/write head, a suspension drive device for moving said suspension arm between a inner most position and an outer disk position along a radial direction of said data recording disk and a spindle motor for rotating said data recording disk, comprising:

a circuit means connected between said suspension drive device and said spindle motor for responding to a turn off of power applied to said disk drive device and said servo track writer to connect windings of said spindle motor to said suspension drive device to apply counterelectromotive force generated in said windings to said suspension drive device to move said suspension arm to said outer disk position;

a clock read/write head for writing clock patterns on said data recording disk; and a drive device for moving said clock read/write head between an operational position for writing said clock patterns and a standby position retracted from said operational position;

said drive device comprising:

a cylinder means including a first port and a second port for moving a moving member to a first position when an air is supplied to said first port and moving said moving member to a second position when said air is supplied to said second port;

means for supplying said air to said first port when a power is supplied to said disk drive device and said servo track writer and for supplying said air to said second port when said power is turned off; and a supporting member coupled to said moving member of said cylinder means for moving said clock read/write head to said operational position when said moving member is moved to said first position and for moving said clock read/write head to said standby position when said moving member is moved to said second position.

* * * * *